United States Patent [19]
Florent et al.

[11] Patent Number: 5,675,380
[45] Date of Patent: Oct. 7, 1997

[54] DEVICE FOR FORMING AN IMAGE AND METHOD OF CORRECTING GEOMETRICAL OPTICAL DISTORTIONS IN AN IMAGE

[75] Inventors: Raoul Florent, Valenton; Pierre Lelong, Nogent-Sur-Marne, both of France

[73] Assignee: U.S. Philips Corporation, New York, N.Y.

[21] Appl. No.: 575,537

[22] Filed: Dec. 20, 1995

[30] Foreign Application Priority Data

Dec. 29, 1994 [FR] France ................... 9415872

[51] Int. Cl.$^6$ ................................................ H04N 5/217
[52] U.S. Cl. ............................... 348/251; 348/247
[58] Field of Search ........................ 348/175, 187, 348/188, 189, 190, 241, 246, 247, 251, 615, 616, 745, 746, 806; H04N 17/00, 5/217

[56] References Cited

U.S. PATENT DOCUMENTS

| | | | |
|---|---|---|---|
| 4,695,884 | 9/1987 | Anastassiou et al. | 348/615 |
| 5,241,372 | 8/1993 | Ohba | 348/578 |
| 5,270,519 | 12/1993 | Richards et al. | 348/347 |
| 5,436,659 | 7/1995 | Vincent | 348/247 |
| 5,444,478 | 8/1995 | Lelong et al. | 348/39 |
| 5,444,794 | 8/1995 | Hirono et al. | 348/190 |
| 5,453,840 | 9/1995 | Parker et al. | 348/188 |

FOREIGN PATENT DOCUMENTS 2256989 12/1992 United Kingdom.

OTHER PUBLICATIONS

Rebaia et al;"Image Distortion From Zoom Lenses: modeling and digital Correction", Jul. 3–7, 1992, pp. 438–441 w/abstract.

Signal Processing , vol. 17, No.3 Jul. 1989, "Iterative Restoration of Noisy Elastically Distorted Periodic Images", Unser et al, pp. 191–200.

Ieee Transactions on Medical Imaging, vol. 11, No.1, Mar. 1992, "Correction of Distortion in Endoscope Images", by Warren E Smith et al., pp. 117–122.

*Primary Examiner*—John K. Peng
*Assistant Examiner*—Jeffrey S. Murrell
*Attorney, Agent, or Firm*—Edward W. Goodman

[57] ABSTRACT

The device includes systems for picking up (1), acquiring (2) and digitizing (3) a distorted source image (SI), a system for processing digital images (4, 47) for constructing a distortion-corrected target image (TI) corresponding to the source image (SI), this system including a first sub-assembly (4) for predetermining, on the basis of the data of a distorted TEST source image (SG°), an optical center (OC") and a polynomial function ($F_n$) for correcting radial distortions around this optical center, and a second sub-assembly (47) which applies the polynomial correction function to each address of the pixel of the target image (TI) for furnishing the address of a point in the distorted source image (SI) in which an intensity data is present which is applied to the initial address in the target image. The method includes the computation, in a TEST source image (SG°), of an optical center (OC") at the center of optical distortions, and of a polynomial function ($F''$) for correcting distortions for constructing a TEST target image (TI).

11 Claims, 10 Drawing Sheets

DEVICE FOR FORMING AN IMAGE AND METHOD OF CORRECTING GEOMETRICAL OPTICAL DISTORTIONS IN AN IMAGE

BACKGROUND OF THE INVENTION

1. Field of the Invention

The invention relates to a device for forming an image, comprising:

a camera system, a system for acquisition of the data of a source image distorted by the camera system, a system for digitizing said source image including a first image memory for storing the intensity data of each pixel marked by an address in a bi-dimensional matrix, and a system for processing the digital image for constructing a distortion-corrected target image corresponding to the source image.

The invention also relates to a method of correcting geometrical optical distortions produced by such a camera device in an image.

The invention is used for correcting digitized images in the field of X-ray systems or in video systems, or in digital image systems.

Significant geometrical distortions may be introduced by the objective of a camera in the image produced by this camera, particularly if this objective is of the wide angle type. These geometrical distortions are most frequently of the barrel type or of the pincushion type. These geometrical distortions appear even if the objective of the camera has a very good quality.

2. Description of the Related Art

A device for compensating optical imperfections in a television camera is already known in the state of the art from UK Patent Application GB 2,256,989, corresponding to U.S. Pat. No. 5,276,519.

This device comprises a camera registering the image formed by the optical system and means for digitizing this image, which include storage of the intensity data of each current pixel.

This device also comprises an error corrector for compensating the geometrical, registering and chromatic errors and for also compensating the optical imperfections of the lens system.

This error corrector is controlled by a correction control unit. This correction control unit receives exterior information components via an interface, these components being suitable for programming the unit so that it can apply control signals to the error corrector which take the parameters of the camera system into account. Under these conditions, the error corrector is capable of correcting the pixel data.

In the error corrector, a cartographic memory receives these control signals from the correction control unit in dependence upon the parameters of the camera system. This cartographic memory is tabulated as a function of these parameters for defining the cartography which is necessary for correcting the faults of the optical system with a given lens type and under given camera conditions.

The output of the cartographic memory is applied to an interpolator used for enhancing the definition of the output image.

The cartographic memory is calibrated by applying a test pattern to the pick-up camera having a regular square grating design and by manually adjusting the stored parameters so that a corrected grating is obtained at the output of the device. This operation may be realized by displaying, for example the output signal of the device on a screen provided with a superimposed graticule.

The device known from U.S. Pat. No. 5,276,519 does not correct the imperfections of the camera system in an automatic manner. It is necessary to supply it with data about the focal length of the lens, the camera distance and the zoom rate used. Moreover, a cartographic memory should contain tables for each lens type and each camera condition, these tables including information relating to the new addresses to be assigned to the pixels of the target image for replacing the original addresses of these pixels in the source image, that is to say, in the image directly originating from the camera system and being beset with imperfections. The target image may thus be corrected from the distortions of the source image.

No automatic tabulation means for the cartographic memory or automatic means for computing the correction functions to be applied to the pixels of the source image for obtaining the pixels of the target image are described in the document cited hereinbefore. Only means for manual calibration of the cartographic memory have been described, including the superposition of the distorted target image of a grating on a reference graticule and the manual correction of the input parameters of the camera system.

SUMMARY OF THE INVENTION

It is an object of the present invention to provide a device and a method for calculating correction functions of the optical distortions of a camera system in order to obtain pixel data with which a corrected target image can be constructed.

It is another object of the present invention to provide such a device and a method for automatically computing such correction functions without having to take the parameters of the camera system into account.

These objects are achieved by means of a device as described in the opening paragraph, in which the system for processing the image includes:

a first sub-assembly for predetermining, on the basis of image data of a distorted TEST source image, an optical center and a polynomial function for correcting radial distortions around said optical center, and a second sub-assembly including a memory for storing the optical center and the polynomial function determined by the first sub-assembly, a computing block applying the polynomial correction function to each pixel address of the target image for supplying the address of a pixel in the distorted source image in which an intensity data is present which is to be applied to the initial address in the target image, and a second image memory for storing data of the reconstructed target image.

A method of correcting optical distortions produced in an image by a camera system comprises the preliminary steps of:

a) acquiring data and digitizing a TEST source image, including the storage of the intensity data of each pixel marked by an address in a bi-dimensional matrix, b) estimating an optical center located at best at the optical distortion center of the TEST source image and the ratio of said optical center computed in a digital image to be constructed, referenced TEST target image representing the corrected TEST source image of the optical distortions, and c) estimating a polynomial function for causing the address of a corresponding point denoted reference point in the distorted source image to correspond to the address of a pixel in the corrected TEST target image, based on the hypothesis that the geometrical optical distortions in the source image are radial around the distortion center, so that said corresponding points are aligned at best with the estimated optical center.

In the preliminary steps, such a method may also comprise the iterative steps of:

d) estimating the best polynomial function $F^{Nopt}$ capable of minimizing, at an iteration of the order of Nopt, the patterning error realized at the localization of the pixels of the TEST target image constructed at a preceding iteration in accordance with the hypothesis of radial distortions around an optical center $OC^n$ estimated at said preceding iteration, and e) estimating, at an iteration of the order of Nlast, an optimized modified optical center $OC^{Nlast}$ and re-estimating, under these conditions, a new polynomial function $F^{Nopt(Nlast)}$ capable of further minimizing the patterning error realized at the localization of the pixels of the reconstructed target image in accordance with the hypothesis of radial distortions around said best estimated optical center $OC^{Nlast}$.

These and other aspects of the invention will be apparent from and elucidated with reference to the embodiments described hereinafter.

DESCRIPTION OF THE PREFERRED EMBODIMENTS

I. DEVICE (FIGS. 1A, 2A, 2B)

A camera system may generally include an optical lens system of the wide angle type or a zoom lens system which produce geometrical optical distortions in the image formed by this camera. These distortions appear even when the optical system has a very good quality.

Figure 1A:
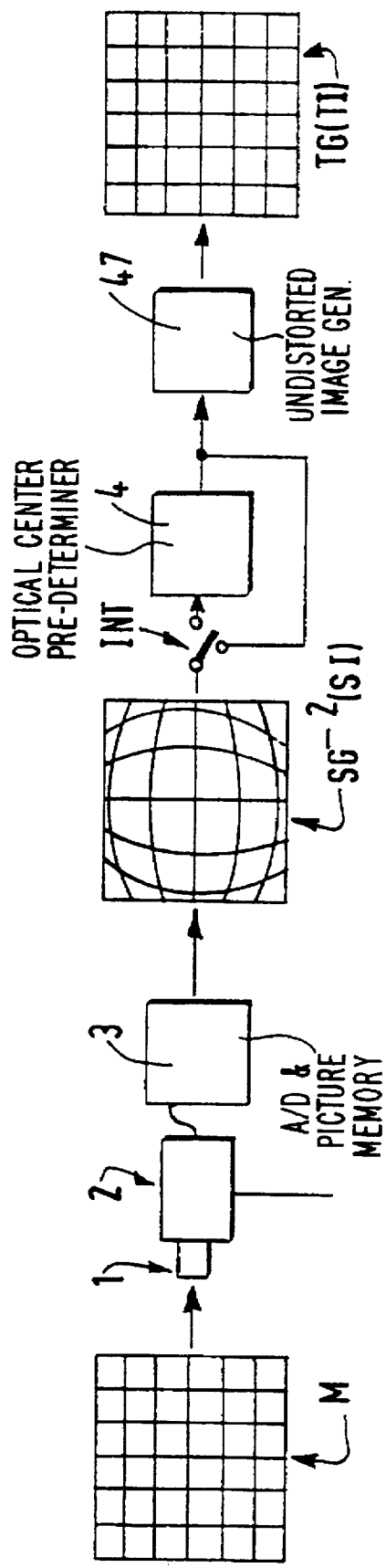
FIG. 1A shows a device for forming images including a camera system and two sub-assemblies of a system for processing digital images, one for determining and the other for applying the geometrical correction rules for optical distortions of the camera system.

With reference to FIG. 1A, a device for forming an image comprises a camera system 1 consisting of an optical lens system which supplies a distorted image of a scene. This optical lens system 1 is attached to a camera 2 which converts the optical image into electric signals by way of, for example, a CCD. These electric signals are applied to a digitization system 3 which is capable of storing the digitized image data, i.e., the intensity data relating to each address of the pixels of the image, in a bi-dimensional matrix, in a first picture memory. These digitized image data relate to the distorted image.

This device for forming images also comprises a system for processing the digital signal, which system comprises a sub-assembly 47 processing the digitized image data stored in the picture memory of the digitization system 3 for supplying data of a corresponding digital image reconstructed with a correction of distortions, which data are finally stored in a second picture memory.

The digital image data at the output of the digitization system 3, relating to an image distorted by the camera system, will hereinafter be referred to as source image SI, and the digital image data supplied by the sub-assembly 47 of the image processing system relating to the distortion-corrected reconstructed image, will be referred to as target image TI.

The sub-assembly 47 of the image processing system comprises, on a chip-card or in a look-up table, rules for correcting the distortions for constructing the corrected target image TI. These rules may be determined by means of a method comprising preliminary steps. One of the objects of the invention is to provide such a method for determining these correction rules in an automatic manner. The correction rules are determined once for all operations in a first sub-assembly 4 of the processing system. Subsequently, they are automatically applied by means of the sub-assembly 47 of the image processing system referred to as second sub-assembly 47. With the switch INT shown in FIG. 1A, the first sub-assembly 4 of the processing system can be switched off when these rules have been determined.

Figure 2A:
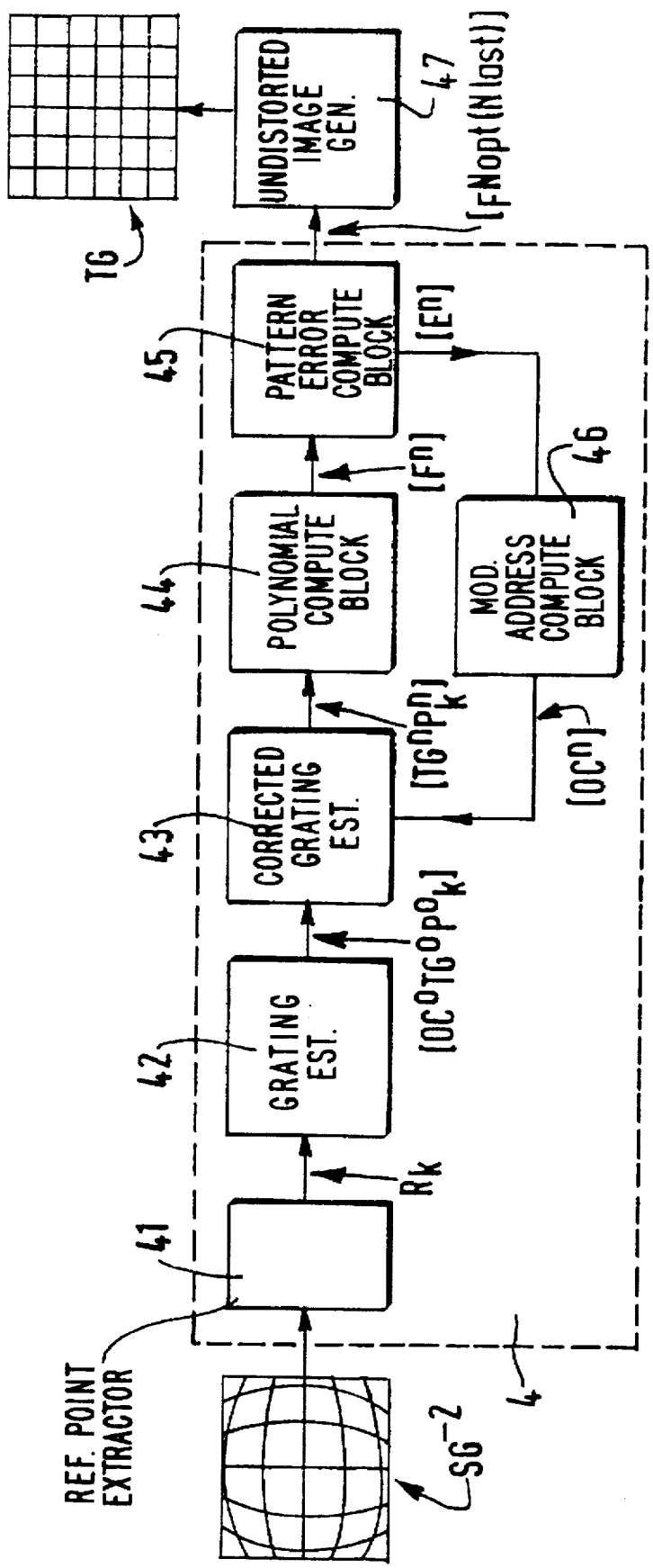
FIG. 2A shows a block diagram of the first sub-assembly of the image processing system for performing a method of determining the correction rules and determining the distortion center for geometrically correcting the optical distortions produced by the camera system.

The first sub-assembly 4 includes, as shown in FIG. 2A, a block 41 for extracting reference points ($R_k$) at the points of intersection of the bars of the source grating ($SG^0$). The output from block 41 is connected to an input of block 42 for estimating the first approximate theoretical grating ($TG^0$), computing the address of a center ($GC^0$) and the step size ($GM^0$) of said first theoretical grating ($TG^0$). The output from block 42 is connected to a first input of block 43 for estimating a distortion-corrected theoretical grating ($TG^n$), computing by way of iteration the address of a center ($GC^n$) and the step size ($GM^n$) of said corrected theoretical grating ($TG^n$). A block 44 for computing a correction polynomial of the radial distortions is connected to the output of block 43. This block 44 provides a transformation rule for passing a point of the corrected theoretical grating at the iteration $n(TG^n)$ to a reference point ($R_k$) of the distorted source grating, this transformation rule operating at the iteration n. The output from block 44 is connected to a block 45 for computing a patterning error ($E^n$) due to the iteration n transformation rule. The output from block 45 forms the output of the first sub-assembly 4, and is also connected to a block 46 for computing a modified address of the optical center ($OC_n$) which minimizes the patterning error, which is connected to a second input of block 43.

Figure 2B:
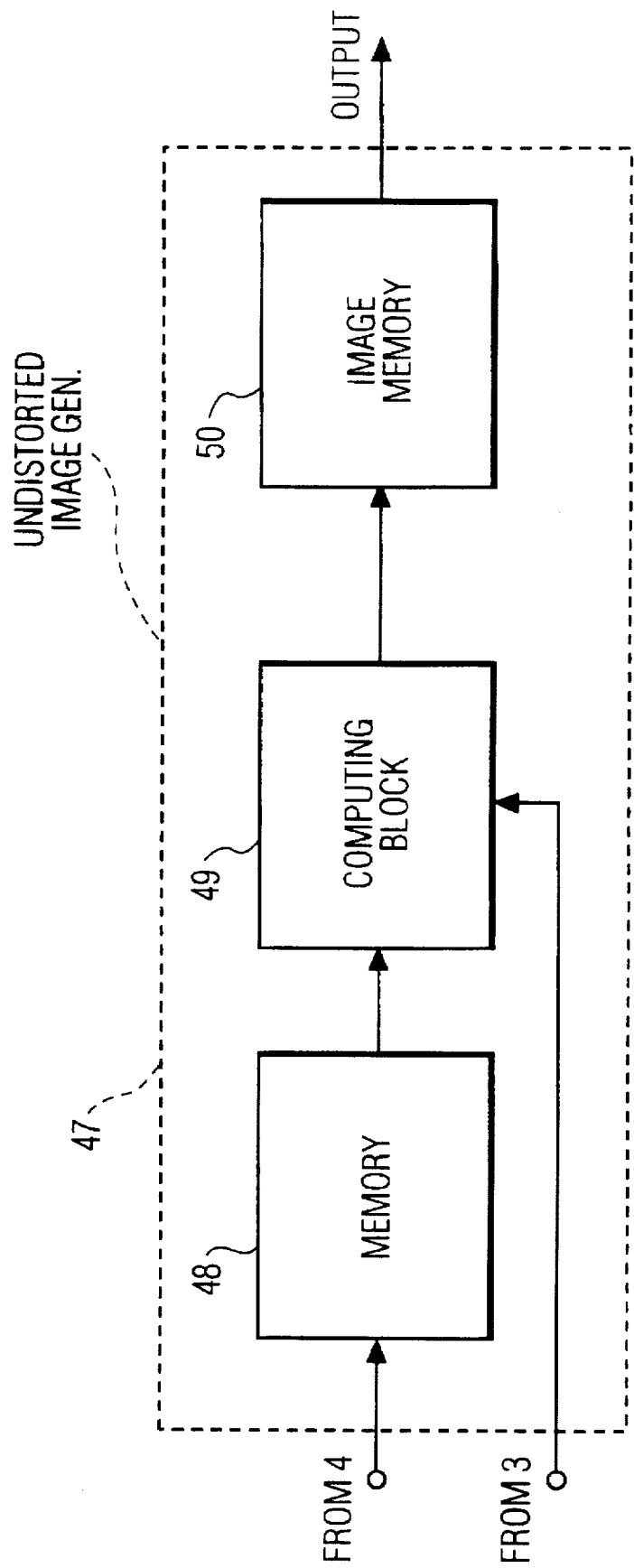
FIG. 2B shows a block diagram of the second sub-assembly of the image processing system.

As shown in FIG. 2B, the second sub-assembly 47 includes a memory 48 connected to the output of the first sub-assembly 4 for storing the optical center and the polynomial function determined by the first sub-assembly 4. A computing block 49 then applies the polynomial correction function to each pixel address of the target image (TI) for supplying the address of a pixel in the distorted source image (SI), received from the digitization system and first picture memory 3, in which an intensity data is present which is to be applied to the initial address in the target image. A second image memory 50 is then provided for storing data of the target image.

The method of determining the correction rules performed in the first sub-assembly 4 of the image processing system will subsequently be described. This first sub-assembly 4 may also be an extension of the digitization system 3, or it may be integrated in this digitization system 3.

In the device for forming the image according to the invention, as shown in FIGS. 1A, 2A and 2B:

(a) in the first sub-assembly 4 of the processing system, computing steps are carried out for determining once for all operations:

rules for correcting the geometrical distortions produced by the camera system 1, and precise localization of the center of the geometrical distortions which is also the optical center of the lens system of the camera in the majority of cases; and (b) in the second sub-assembly 47 of the processing system, computing steps are carried out for constructing a distortion-corrected target image TI by means of said rules and the knowledge of the center of distortion for each distorted source image SI.

This will be continued with a description of:

a method of determining these rules for correcting the geometrical distortions and for concomitantly determining the precise localization of the distortion center, carried out in the first sub-assembly 4, and a method of constructing the target image TI by using this knowledge, carried out in the second sub-assembly 47.

II. METHOD OF DETERMINING THE CORRECTION RULES AND THE DISTORTION CENTER (FIG. 1, Block 4; FIG. 2A, Blocks 41 to 46)

A method of concomitantly determining these correction rules and the precise coordinates of the distortion center will be described hereinafter with reference to FIG. 2A which shows the different steps by way of a block diagram.

This method does not require any preliminary measurements, such as the measurement of the focal length, or the measurement of the camera distance, or the real measurement of the test pattern pitch.

This method is based on the hypothesis that the geometrical distortions generated by the camera system are radial, that is to say, in the target image constructed by the second sub-assembly 47 of the processing system, a corrected point should be present on a radius determined by the distorted point and by the distortion center. For this reason, this method requires, in addition to determining the correction rules, a concomitant precise determination of the distortion center. Nevertheless, this method does not require any preliminary precise real measurements. In this method, the aim is not a precise measurement by means of, for example a sensor, of the localization of the optical center of the camera, because only the distortion center of the source image is interesting due to the fact that the distortions are radial around the distortion center.

With reference to FIG. 2A, this method, performed in the first sub-assembly 4, comprises at least the following steps:

II. A. ACQUISITION OF A PATTERN

This step comprises the following sub-steps:

II.A1. Construction of a Pattern (FIG. 1A)

A test pattern M is realized.

To this end, the design of a grating on a plane, rigid support is preferably realized. The meshes of this grating may be square-shaped or rectangular. In one example, this pattern may be a design on a white base support of 1 m×1.50 m representing horizontal and vertical black bars forming squares as shown at M in FIG. 1A.

II.A2. Calibration of the Camera (FIG. 1B, FIG. 1C, FIG. 3A)

Figure 1C:
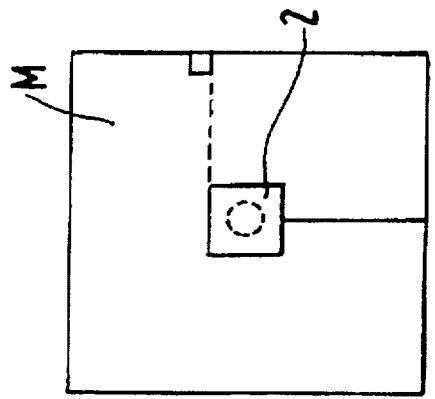
FIGS. 1B and 1C illustrate the calibration step of acquiring a test pattern by the camera system.
Figure 1B:
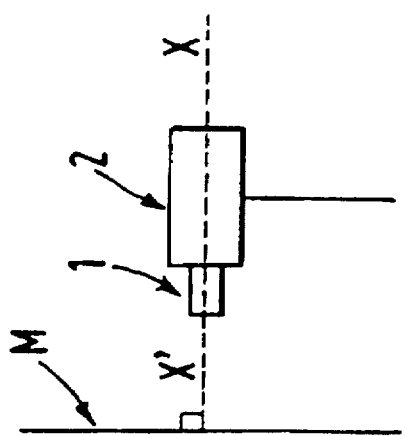
Figure 3A:
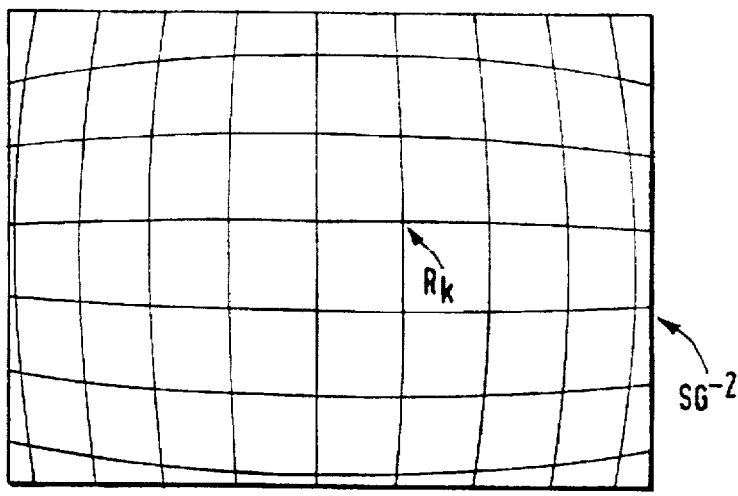
FIGS. 3A to 3G show source and target images in the different steps of the method.

The camera is placed to face the plane of the pattern M for acquisition of a net image of this pattern. A calibration is realized before pick-up. This calibration consists of:

rendering the plane support of the pattern M perpendicular to the optical axis X'x of the pick-up camera, as illustrated in FIG. 1B;

rendering the bars of the grating parallel to the rows and columns of the CCD element of the camera 2, as illustrated in FIG. 1C; and placing the plane support of the grating in such a way that the whole image plane of the camera is covered by the grating squares, as illustrated in FIG. 3A.

The calibration conditions thus essentially consist of verifying three conditions of orthogonality, two of which are verified when the optical axis X'X of the camera is perpendicular to the plane of the pattern and the third is verified when the bars of the pattern grating are parallel to the orthogonal rows and columns of the CCD element of the camera.

The calibration operation may be performed by simply using squares. This calibration is not coercive because it appears that the method according to the invention can withstand possible imperfections of this calibration.

II.A3. Acquisition of an Image of the Grating, Serving as a Pattern (FIG. 1A and FIG. 3A), Referred to as Source Grating By means of the camera 2 provided with its optical lens system 1, focusing and pickup is realized of the pattern grating M. The digitization system 3 provides a digitized image in the form of a grating referred to as source grating $SG^{-2}$ having optical distortions as shown in FIG. 3A.

Figure 5A:
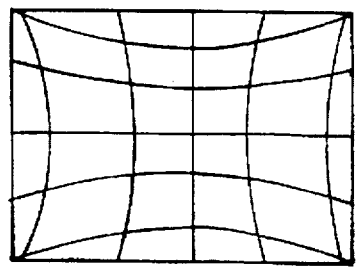
FIGS. 5A and 5B show source images which are pincushion and barrel-distorted, respectively.
Figure 5B:
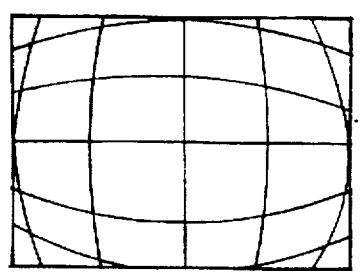

The distortions may be pincushion-shaped as in FIG. 5A or barrel-shaped as in FIGS. 5B and 3A.

II.B. EXTRACTION OF THE REFERENCE POINTS $R_k$ (FIG. 2A, Block 41)

An image of the distorted source grating is digitized and stored in the digitization and storage means 3 shown in FIG. 1.

With reference to FIG. 3A, the points of intersection of the vertical and horizontal bars of the distorted source grating $SG^{-2}$ will hereinafter be referred to as reference points $R_k$ in the digitized image of the source grating $SG^{-2}$. Horizontal and vertical are understood to mean parallel to the rows and columns of the CCD element of the camera, as resulting from the calibration.

As far as the notations are concerned:

for the reference points $R_k$, k is an index with which the points of reference of the source grating can be enumerated, for example, from 1 to 500, and for the images of the source grating, for example, $SG^{-2}$, the index permits of enumerating the image processing step. Here the index (−2) indicates that this step is the second before that which provides the source grating image $SG^0$ which is used for determining the correction rules and the optical center.

With reference to FIG. 2A, the series of operations constituting the steps of the method according to the invention comprises a first step performed in the block 41 consisting of the extraction of reference points $R_k$ of the image of the source grating $SG^{-2}$ by determining their address in this source image by means of the following sub-steps:

filtering of the source image for increasing the intensity of the zones of intersection, thresholding the filtered image intensities; and labelling the thresholded points for forming zones and extracting the barycenter of each zone.

II.B1. Raising the Level of Intensity of the Zones of Intersection by Means of Filtering (FIG. 3b; FIG. 2A, Block 41)

Figure 3B:
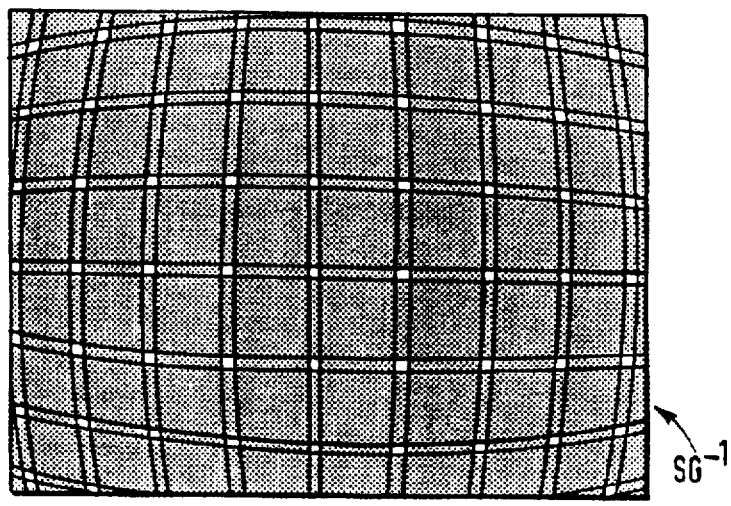

In the case taken as an example, in which the bars of the test pattern grating are represented in black on a white or bright background, the zones of intersection of the vertical and horizontal bars are black as shown in FIG. 3A. In this sub-step, the digitized image of the distorted pattern $SG^{-2}$ is processed for brightening these zones and for darkening the rest of the image. Subsequently, one obtains the image of a source grating denoted $SG^{-1}$ as shown in FIG. 3B.

This operation may be carried out by means of a first method, known to those skilled in the art, consisting of a linear filtering operation by means of linear filters corresponding to correlation masks having the form of a cross.

Instead of a test pattern in the form of a grating, it is also possible to choose a test pattern of dots. Experience has proved that camera registration of a dotted test pattern is less satisfactory than that in the form of a grating because of glare effects. The registration of a test pattern in the form of a grating has the additional advantage that more useful information can be supplied for satisfactorily performing the method according to the invention.

Here, a method is proposed which uses a non-linear filtering operation which is more efficient than the known linear filtering operation. The advantages of this non-linear filtering operation with respect to a conventional linear filter are that:

it produces no glare, it can withstand the distortion at the intersection, and it is easy to carry out.

In the step of extracting the reference points, performed on the digitized source image $SG^{-2}$ of the grating, the increase of the intensities at the intersections of the grating bars is essential. It is thus important to realize a very good filtering operation.

Figure 4A:
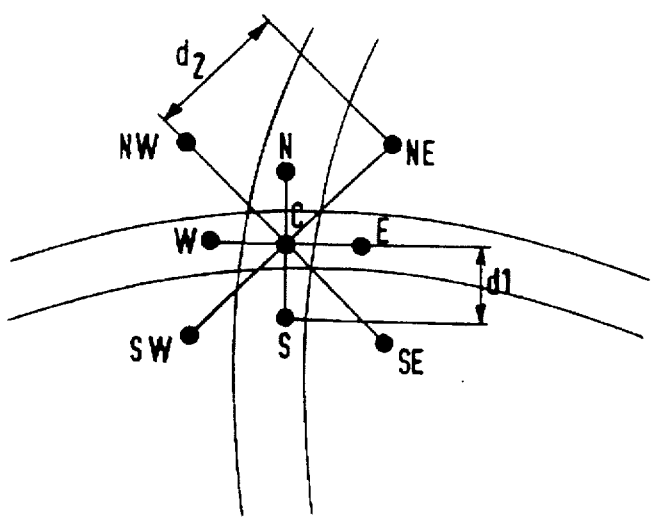
FIG. 4A shows an intersection in the source grating and illustrates the non-linear filtering operation for extracting the reference points.

An intersection of a horizontal grating bar and a vertical grating bar is shown diagrammatically in FIG. 4A. The edges of the horizontal bar and the vertical bar are shown by way of distorted lines in the distorted source image.

In this step, a filter is used at each point of the source image $SG^{-2}$ of FIG. 3A. By way of this filtering operation, one determines:

the center C of the filter, four cardinal points S, N, E, W, and four diagonal points SE, SW, NE, NW.

The 8 points surrounding the center C of the filter are entirely defined by the distances d1 and d2, where d1 is the distance measured in pixels between the center C and the cardinal points (d1=C-S, C-N, C-E, C-W), and d2 is the distance measured in pixels between the center C and the diagonal points (d2=C-SE, C-SW, C-NE, C-NW).

The distance d1 is chosen in such a way that the cardinal points are situated within the design of the bars of the grating, where the center C is situated in the zone of intersection. This result is obtained by choosing d1 to be of the order of 1 to 5 pixels; generally, of the order of half the thickness of a bar of the grating measured in pixels in the distorted image.

The distance d2 is chosen in such a way that the corresponding diagonal points are situated at the bottom of the image, that is, outside the regions of the grating bars. This effect is obtained by choosing d2, measured in pixels, to be of the order of half the pitch of the distorted grating in the digitized image. For example, for a grating having a pitch of the order of 50 pixels, d2 may be 20 pixels.

By choosing reasonable distances d1 and d2 which those skilled in the art can determine by means of several routine tests without any precision being required, this filtering operation may reveal that, when the center of the filter is within a zone of intersection, the cardinal points S, N, E, W are within the regions of the bar design of the grating and the diagonal points are effectively situated at the bottom, even in the regions of the distorted image where the strongest distortions are found.

In the example of the grating formed from black bars on a white background before filtering in the image $SG^{-2}$, each of these five points constituted by the center and the four cardinal points has a low intensity, whereas the four diagonal points have a higher intensity.

By way of the non-linear filtering operation according to the invention, a measurement is realized which is expressed by the following measurement of the FILT criterion: FILT= Min(NW,NE,SE,SW)−Max(C,N,S,E,W). In this criterion, Min(NW,NE,SW,SE) means that the minimum intensity relating to the diagonal points is evaluated, and Max(C,N, S,E,W) means that the maximum intensity relating to the cardinal points including the center is evaluated.

When the filter is correctly centered at an intersection, each diagonal point normally has a large intensity, so the minimum intensity evaluated for the intensity of these points is even larger. On the other hand, each of the five points, the center and the cardinal points normally has a smaller intensity, so the maximum of the intensity evaluated for the intensities of these points is even lower. The result is that there is a large difference between this Min and this Max.

The non-linear filter realizes the evaluation of this FILT criterion at each point of the distorted image of FIG. 3A. The result of computing the FILT criterion constitutes the output of the non-linear filter according to the invention.

The detected regions of intersection are those where the measurement of this criterion is largest. The obtained image resulting from this filtering operation is a new source grating $SG^{-1}$ and shows, as in FIG. 3B, that the regions of intersection are increased in intensity and that other regions of the distorted source image are darkened.

Figure 3C:
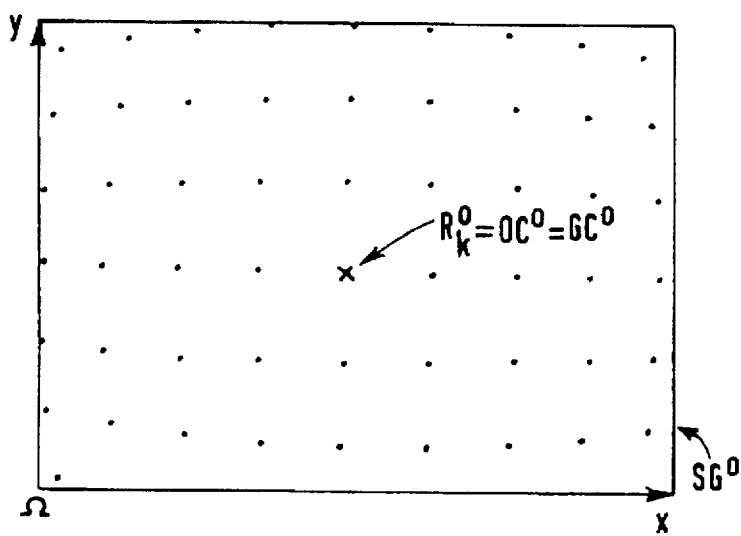

II.B2 Thresholding the Increased Intensities of the Points (FIG. 2A, Block 41; FIG. 3C)

After the sub-step of increasing the intensity of the points of the zones of intersection, a sub-step of thresholding the intensity of these points is realized.

Here, a method will be proposed for performing said thresholding sub-step in order to detect said reference points. In accordance with this method, said thresholding sub-step is performed in the enhanced image $SG^{-1}$ by selecting a reference number Nb representing the number of points having the strongest intensity.

Those skilled in the art, who have acquired the image of the distorted source grating $SG^{-2}$, as shown in FIG. 3A, effect:

- counting of the number N1 of the intersections in the image,
- counting, by taking the digitization into account, of the approximate number N2 of pixels contained in one zone of intersection: each zone of intersection has four sides and its surface is given by the product of thicknesses in pixels of the horizontal and vertical bars of the grating in the distorted image, as is shown, for example, in FIG. 4A, and
- computing the searched number Nb equal to the product of the number of intersections N1 in the distorted image by the approximate number of pixels N2 in a zone of intersection, this number Nb constituting the threshold Nb=N1×N2.

With the aid of this threshold, the pixels pertaining to the zones of intersection are extracted. This extraction consists of retaining a number equal to the computed number Nb among the pixels having the highest intensities after the filtering operation in the enhanced image $SG^{-1}$.

To this end, a histogram is realized by accounting, for each intensity level, for the number of pixels having this intensity. Starting from the highest intensity level, the threshold operation consists of summing the number of pixels per decreasing level of intensity and of terminating the summation when the number Nb threshold is reached. The pixels having the highest intensity are thus retained and their intensity and address data are stored.

At the start of this operation, the image realized from the test grating is only formed of bright zones containing a certain number of pixels which have a higher or equal intensity as compared with the intensity corresponding to the threshold Nb in the histogram, while the background is uniformly dark and deprived of bar details which would be seen after filtering of the image $SG^{-1}$ of FIG. 3B.

II.B3. Labelling the Thresholded Points and Computing the Barycenter of the Zones of Intersection (FIG. 3C; FIG. 2A, Block 41)

The pixels extracted during the previous thresholding sub-step are regrouped by means of a labelling method. The zones of intersection, each containing several regrouped thresholded pixels, are identified and then their barycenter is computed.

For computing the barycenter, each zone of intersection is derived to a single point defined by a pair of coordinates which are not necessarily integer numbers because they are the result of a computation of the barycenter of a zone comprising several pixels.

With reference to FIG. 3C, the barycenters thus extracted constitute points which will hereinafter be referred to as reference points $R_k$ in which k is the number for enumerating each reference point in the source image $SG^0$ thus obtained.

An address in the source image $SG^0$ now obtained corresponds to each $R_k$, given by the coordinates of the computed barycenter. These coordinates are denoted $rx_k$ on the x axis and $ry_k$ on the y axis for a fixed coordinate mark $\Omega x$, $\Omega y$ used in this source image $SG^0$. This mark is orthogonal and its axes coincide with a row and a column of pixels of this image.

In FIG. 3C, the barycenters of extracted reference points $R_k$ are represented by black dots on a white background for convenience of the design, while in the described example, they are actually white on a black background.

II.C. ESTIMATION OF A FIRST THEORETICAL GRATING (FIG. 2A, Block 42)

The inventive method now comprises steps for constructing a target image from a grating, referred to as theoretical grating $TG^n$, which represents the grating $SG^0$ of the source image (FIG. 3C) whose geometrical distortions have been corrected.

At the start of these steps, the method according to the invention provides transform functions permitting the construction of this corrected theoretical grating $TG^n$ in a very precise manner from image data of the source grating $SG^0$; these image data are initially constituted by the coordinates $rx_k$, $ry_k$ of the reference points $R_k$ in the reference frame $\Omega x$, $\Omega y$.

According to the invention, the corrected theoretical grating $TG^n$ is constructed on the basis of the hypothesis that the source image is distorted in a radial manner around a center of distortion with respect to the target image to be constructed.

Figure 3D:
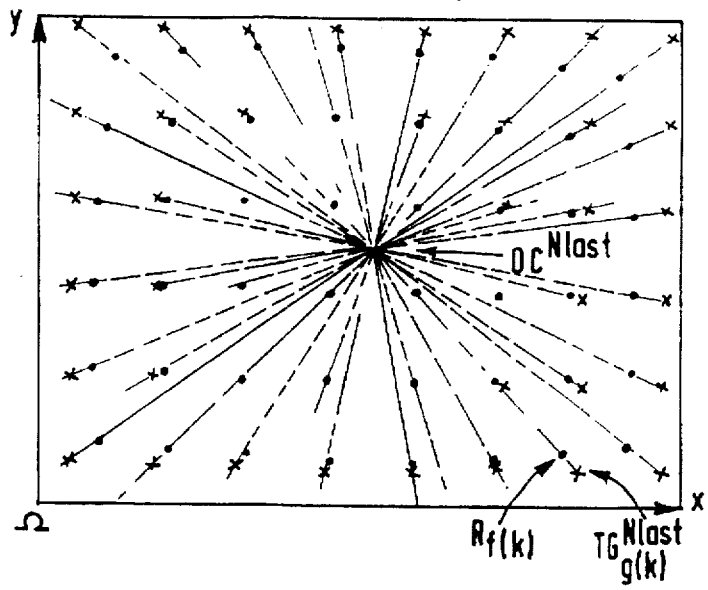
Figure 3E:
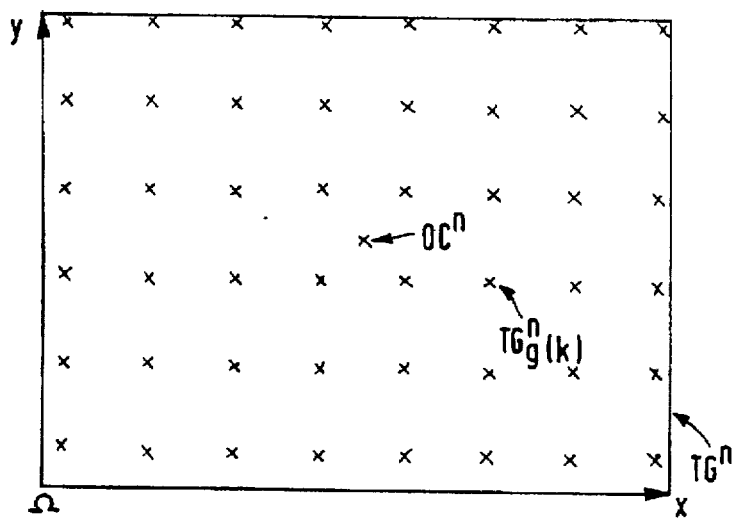
Figure 3F:
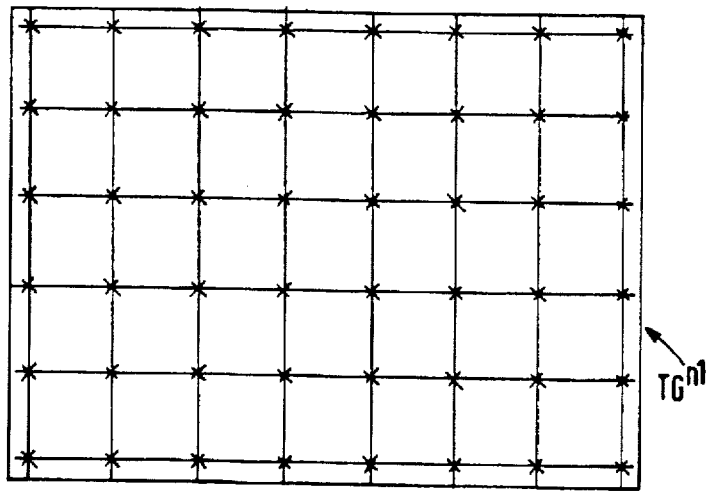
Figure 3G:
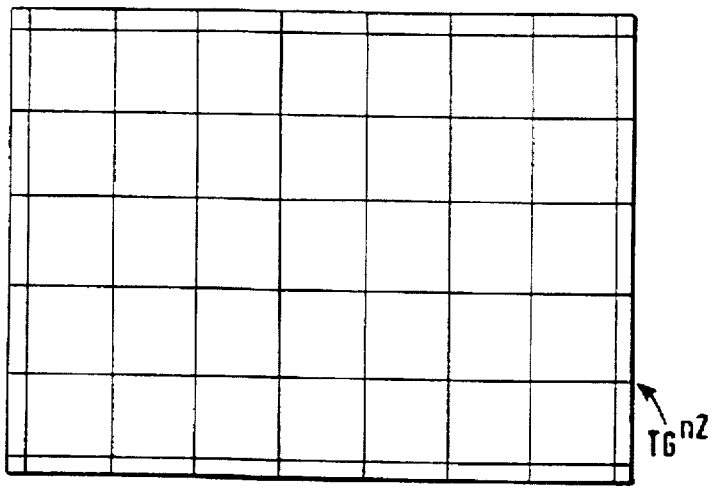

To arrive at a precise construction of this improved theoretical grating $TG^n$, as shown in FIG. 3G, the method first comprises a step in block 42 of FIG. 2A, comprising the following sub-steps for constructing a first theoretical grating $TG^\circ$:

- estimation of a point referred to as center of the target grating, denoted $GC^\circ$, localized at an intersection of a horizontal and a vertical bar of this first theoretical grating. It is referenced by means of its pixel coordinates, $gcx^\circ$ and $gcy^\circ$ in an orthogonal reference frame $\Omega x$, $\Omega y$ of the first theoretical grating whose x axis is parallel to the rows of pixels and whose y axis is parallel to the columns of pixels and whose origin corresponds to the origin $\Omega$ of the fixed reference frame in the source image $SG^\circ$,
- determination of the position of an optical center $OC^\circ$ considered as an approximate distortion center for this first theoretical grating $TG^\circ$,
- estimation of a pitch $GM^\circ$ for this first theoretical grating, defined by the distance in pixels $gmx^\circ$, $gmy^\circ$ between the intersections of the bars of this first target grating in accordance with the x axis and y axis in the fixed reference frame $\Omega x$, $\Omega y$, and
- causing the points $TR_m^\circ$ of the first theoretical grating to correspond to reference points $R_k$ of the distorted source grating $SG^\circ$. The localization of these points $TR_m^\circ$, situated at the intersection of the bars of the first theoretical grating, is defined on the basis of the estimations of the center $GC^o$ and the pitch $GM^o$ realized for this first theoretical grating.

In FIG. 3C and further Figures illustrating the present description, the reference points $R_k$ of the source image are shown by way of small circles and the points of intersection $TR_m^o$ of the theoretical grating are shown by way of small crosses in black on a white background, independent of their real intensity level, so as to simplify the Figures.

11.C1. Estimation of a Center $GC^o$ for the First Theoretical Grating

This first theoretical grating is entirely defined as soon as a center $GC^o$ and a pitch $GM^o$ have been determined. The bars of the theoretical grating are orthogonal and regularly spaced. It should be noted that this center of the theoretical grating may be present at any location in the image and possibly even outside the image.

In this step, the estimation of a center $GC^o$ for the first theoretical grating is effected around the center of distortion of the distorted source grating for easily estimating the pitch $GM^o$ of this first theoretical grating $TG^o$.

By applying the hypothesis of radial distortions, it appears that the real center of distortion of the source grating $SG^o$ is situated in a region of the source image where the distortions are minimal.

The estimation of a center $GC^o$ for the first theoretical grating thus comprises the following succession of operations:

an estimation of a starting point of reference $R_k^o$ in the image of the source grating $SG^o$, near the center of distortion, and the transfer of this starting point $R_k^o$ as the center of the grating $GC^o$ and as the approximate optical center $OC^o$ in the image of the first theoretical grating $TG^o$. The optical center of the first theoretical grating is different from the optical center of the camera 1, 2 of FIG. 1A.

Figure 4B:
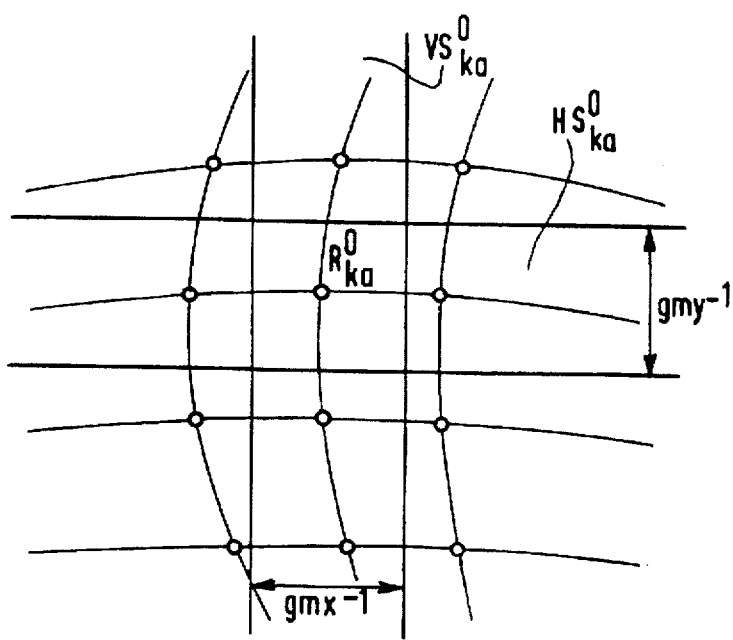
FIG. 4B shows an intersection in the source grating for determining the reference point $R_k^0$ which is nearest to the distortion center, by way of an alignment criterion.

II.C1 a. Estimation of a Reference Point $R_k^o$ near the Center of Distortion in the Source Image $SG^o$ (FIG. 2A, Block 42; FIG. 4B)

In a general manner, any function capable of furnishing the estimation of a reference point denoted $R_k^o$ which is nearest to the center of distortion of the source grating $SG^o$ may be used. A simple and appropriate method of carrying out this operation will be presented hereinafter.

With reference to FIG. 4B, a reference point $R_k^o$ of the source grating, as shown in FIG. 3C, is near the real center of distortion while it is localized in a region of this source grating $SG^o$ where the distortions are smallest. FIG. 4B shows a reference point denoted $R_{ka}^o$ and an assembly $S_{ka}^o$ of neighboring reference points surrounding this reference point $R_{ka}^o$. The assembly of points $S_{ka}^o$ may be decomposed into two reference point sub-assemblies:

a horizontal sub-assembly denoted $HS_{ka}^o$ composed of reference points situated on the same horizontal bar of the grating in the source image as the starting point of reference $R_{ka}^o$, and a vertical sub-assembly denoted $VS_{ka}$ composed of reference points situated on the same vertical bar of the grating in the source image as the starting point of reference $R_{ka}^o$.

Among all the reference points of the source grating $SG^o$, that $R_k^o$, which is nearest to the real center of distortion, is searched.

For determining the reference points $R_k$, those skilled in the art have already approximately determined the pitch of the source grating, denoted $GM^{-1}$ in FIG. 3A, in the filtering step I.BI., illustrated in FIG. 4A. This approximate pitch of the source grating is defined by two distances $gmx^{-1}$ and $gmy^{-1}$ along the coordinate axes $\Omega x$ and $\Omega y$ of the source image $SG^o$.

According to the invention, an alignment criterion with respect to a horizontal band and a vertical band of lengths equal to the horizontal and vertical components of the approximate pitch $GM^{-1}$, i.e., of lengths $gmx^{-1}$ and $gmy^{-1}$, respectively, is now proposed, these bands being centered at the tested reference point $R_{ka}^o$. In these bands, the points forming the sub-assembly $HS_{ka}^o$ and the sub-assembly $VS_{ka}^o$, respectively, are selected.

It follows from the radial hypothesis that the nearer the tested reference point $R_{ka}^o$ is to the center of distortion, the more the points of the sub-assemblies $VS_{ka}^o$ and $HS_{ka}^o$ are aligned and the more numerous the points of these sub-assemblies in each of the bands having lengths $gmx^{-1}$ and $gmy^{-1}$, respectively, as shown in FIG. 4B.

With reference to the diagram of FIG. 4B, the following alignment criterion is proposed:

$$AL(ka)=\Sigma[(0,5\ gmx^{-1}-|rx_k-rx_{ka}|)^2+(0,5\ gmy^{-1}-|ry_k-ry_{ka}|)^2]S_{ka}$$

in which $rx_k$, $ry_k$ are the coordinates of a reference point $R_k$ of one of the sub-assemblies $HS_{ka}^o$ and $VS_{ka}^o$, and in which $rx_{ka}$, $ry_{ka}$ are the coordinates of the tested reference point for forming the reference point $R_k^o$ which is nearest to the center of distortion.

The proposed criterion $AL(ka)$ is computed for each assembly $S_{ka}^o$ of reference points of the source grating $SG^o$ (FIG. 3C). It appears that:

the larger the measurement represented by this criterion $AL(ka)$, the more points exist which relate to this assembly $S_{ka}^o$. Thus, there are also more reference points of the source grating $SG^o$ which are sufficiently aligned with the tested reference point so as not to pass, with this tested point $R_{ka}^o$, a geometrical distance which is equal to half the component of the approximate pitch $gmx^{-1}$ horizontally and $gmy^{-1}$ vertically, and this criterion is thus a naturally satisfactory description of a slightly distorted region.

In this computation of the alignment criterion $AL(ka)$, the reference points of the assembly $S_{ka}^o$ may be given weights which are smaller as these points are further remote from the tested reference point $R_{ka}^o$.

II.C1 b. Transfer of the Retained Reference Point $R_k^o$ in the First Theoretical Grating $TG^o$ to Be Constructed

The reference points $R_k$ of the source grating $SG^o$ of FIG. 3C are tested by applying the proposed alignment criterion $AL(ka)$ and a reference point $R_k^o$ for which the measurement of the criterion is largest is retained. This point $R_k^o$ is transferred in the image of the first theoretical grating $TG^o$ to be constructed. It is then referenced as the center $GC^o$ of the first theoretical grating $TG^o$ and its coordinates $gcx^o$ and $gcy^o$ are stored within the reference frame $\Omega x$, $\Omega y$. It will be noted that the center of the grating in the theoretical grating is always at an intersection of bars.

An optical center $OC^o$ of the first theoretical grating is also chosen to be coincident with this center $GC^o$. The optical center of the theoretical grating is hereinafter defined as the best center of distortions known in the step of the method in progress.

I.C2. Estimation of a Pitch $GM^o$ for the First Theoretical Grating

The approximate value $GM^{-1}$ of the grating pitch, used by those skilled in the art in the phases of the process from the start till the preceding sub-step of estimating a center of the grating $GC^o$ for the first theoretical grating $TG^o$, must now be improved. To this end, a method of computing the pitch of the first theoretical grating is hereinafter proposed, and is effected in two filtering operations:

a first filtering operation for determining a growth value of a pitch $GM^{oo}$ of the first theoretical grating, and a second filtering operation for determining a more precise value of a pitch $GM^o$ for the construction of the first theoretical grating $TG^{oo}$.

Figure 4C:
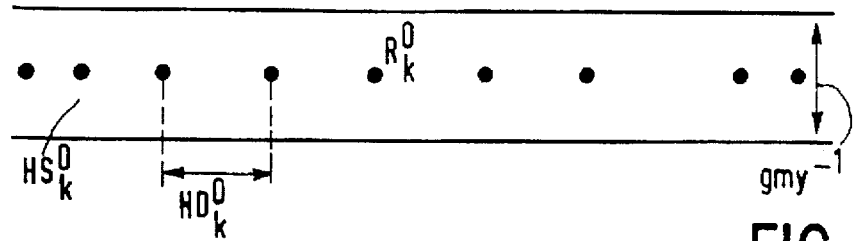
FIG. 4C shows a horizontal sub-assembly $HS_k^0$ of reference points for determining the step of the first grating $TG^0$ by means of a first median filtering operation.

II.C2 a. First Filtering Operation for Determining a Growth Value of a Pitch $GM^{oo}$ for the First Theoretical Grating (FIG. 4C)

In the previous sub-step, a center of the grating $GC^o$ for the construction of the first theoretical grating has been estimated as the reference point $R_k^o$ which is nearest to the center of distortion in the source image $SG^o$.

With reference to FIG. 4B, an assembly of reference points $S_k^o$ is associated with this point of reference $R_k^o$, which assembly can be decomposed into two sub-assemblies of reference points:

a horizontal sub-assembly denoted $HS_k^o$ composed of reference points situated on the same horizontal bar as the reference point $R_k^o$ in the source image $SG^o$, bounded by a horizontal band having a height $gmy^{-1}$ which is the vertical component of the approximate grating pitch $GM^{-1}$; and a vertical sub-assembly denoted $VS_k$ composed of reference points situated on the same vertical bar as the reference point $R_k^o$ in the source image $SG^o$, bounded by a vertical band having a length $gmx^{-1}$ which is the horizontal component of the approximate grating pitch $GM^{-1}$.

With reference to FIG. 4C, the first gross computation of the two components $gmx^{oo}$ and $gmy^{oo}$ of a pitch for the first theoretical grating is performed by:

computing the component $gmx^{oo}$ along the $\Omega x$ axis of the fixed reference frame as the result of the filtering operation by means of a median filter applied to the distances $HD_k^o$ between the reference points of the horizontal sub-assembly $HS_k^o$, and computing the component $gmy^{oo}$ along the $\Omega y$ axis of the fixed reference frame as the result of the filtering operation by means of a median filter applied to the distances between the reference points of the vertical sub-assembly $HS_k^o$.

To this end, the reference points are arranged in the horizontal sub-assembly $HS_k^o$. The same is done in the sub-assembly $VS_k^o$ not shown; subsequently the values of the distances between these reference points are computed and these values are arranged from the smallest to the highest value. Subsequently, a median filter is applied for the values arranged horizontally and vertically in the assemblies $HS_k^o$ and $VS_k^o$. The median filter retains the value situated in the middle of the horizontally arranged values for $gmx^{oo}$; and vertically for $gmy^{oo}$.

The median filters have the advantage that they furnish results which are resistant to localization errors of the points processed. The result remains particularly correct in the horizontal or vertical band of processed points even when a point is missing because it has not been extracted or when an extracted point exists by mistake. The median filters give better results than the simple computations of average values.

The measurements effected in this first phase of the filtering operation constitute a strong pair $gmx^{oo}$, $gmy^{oo}$ for a gross value of the pitch in the construction of the first theoretical grating. However, this gross value does not have the sufficient precision for constructing the first theoretical grating. For this reason, a second filtering operation is performed for providing a value of the grating pitch which is sufficiently precise to start this construction.

Figure 4D:
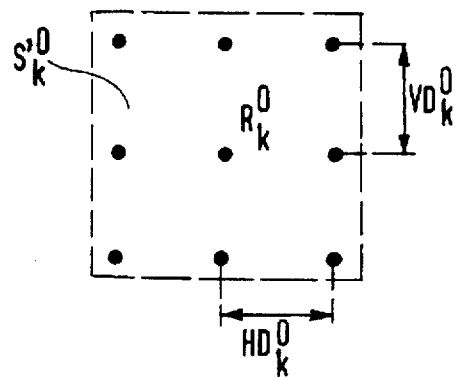
FIG. 4D shows a central sub-assembly $S_k^0$ of reference points for determining the step of the first theoretical grating $TG^0$ by means of a second median filtering operation.

II.C2 b. Second Filtering Operation for Determining a More Precise Value of a Pitch $GM^o$ for the Construction of the First Theoretical Grating (FIG. 2A, Block 42; FIG. 4D)

With reference to FIG. 4D, a sub-assembly $S_k^o$ of 8 reference points is selected, these reference points being situated around the reference point $R_k^o$ retained as the points nearest to the center of distortion in the source image $SG^o$. Each of its neighbors is searched by using the approximate value of the pitch $GM^{oo}$ determined in the first computation. Each of these 8 neighbors is identified as the reference point best corresponding to this first computation.

A median filter is used again which now acts on the values of the distances between the reference points thus defined. In this second filtering operation, 6 horizontal intervals $HS_k^o$ and 6 vertical intervals $VA_k^o$ are used; these intervals are arranged in ascending values and the new values of the horizontal and vertical components $gmx^o$ and $gmy^o$ of the grating pitch, denoted $GM^o$, are determined by median filtering, which components are situated in the middle of these horizontally and vertically arranged values which are more precise than the values determined in the filtering operation of the previous step, because the filtering operation is solely realized in a region of the source image which is near the center of distortion and thus presents the smallest distortions.

It will be noted that in each of these two filtering operations, reference points used for passing the median filters may be erroneous or missing. However, due to the fact that these first and second filtering operations are based on the selection of median values of the intervals considered, the results are not notably affected.

At the end of this sub-step, performed in two operations, the result is:

a strong measurement, and a sufficiently precise measurement of a pitch $GM^o$= ($gmx^o$, $gmy^o$) for the construction of the first theoretical grating. These data are stored.

In the method according to the invention, the strength of the image starting data for constructing the first theoretical grating, namely:

the center of the grating $GC^o$ determined by the coordinates of a reference point $R_k^o$ near the center of distortion, the optical center $OC_o$ also determined by means of $R_k^o$, and the pitch of the grating $GM^o$, are very important because the invention envisages to provide an automatic method of determining the correction functions.

II.C3. Estimation of First Pairs $P_K^o$ Formed from the Reference Points $R_k$ of the Source Grating $SG^o$ and the Points $TR_{m^o}$ of the First Theoretical Grating $TG^o$ (FIG. 2A, Block 42)

With the knowledge of:

coordinates $gcx^o$, $gcy^o$ of the center of the grating $Gc^o$, and components $gmx^o$, $gmy^o$ of the pitch of the grating $GM^o$, in the fixed reference frame $\Omega x$, $\Omega y$, the first theoretical grating is constructed by placing, in this fixed reference frame, the intersections of its bars denoted $TR_m^o$, where m is an index enabling the enumeration of each point of intersection in the theoretical grating.

In this step, reference points, as shown in FIG. 3C, are used for the source image $SG^0$ and for the first theoretical grating $TG^0$ as defined above. Starting from these two images $SG^0$ and $TG^0$, pairs, denoted $P_k^0$, of corresponding points formed from a reference point $P_k$ and a theoretical grating point $TR_m^0$ are determined for the first time.

This correspondence is written in the form of:

$$P_k^0 = [R_{f(k)}, TR_{g(k)}^0]$$

in which f and g are functions of correspondence between the reference points $R_k$ of the source grating and the searched points of intersection $TR_m^0$ of the theoretical grating. In fact, nothing indicates that the point $TR_m^0$, found in the theoretical grating $TG^0$ for corresponding to $R_k$ in the source grating $SG^0$, will have the same number and thus the same index as the reference point $R_k$.

For example, $R_k$ in $SG^0$ may have the number 100 (k=100), while $TR_m^0$ in $TG^0$ may have the number 200 (m=200). In this case, we write f(k)=g(k), i.e., f(100)=g(200) when the points $R_k$ and $TR_m^0$ are paired and a relation of correspondence of the points of the pair $P_k^0$ would thus be determined. This might be, for example, f(100)=g(200)= 120.

In the region of small distortion near the center of the grating $GC^0$, the operation of realizing correspondence consists of selecting the pairs $P_k^0$, each formed from a reference point $R_{f(k)}$ and a point $TR_{g(k)}^0$ of the first theoretical grating which are nearest to each other on the basis of a simple proximity criterion.

As one moves away from the center, this manner of operation can no longer be used because the points of the pairs will be increasingly further away from each other and towards the edges of the source image $SG^0$ and the target image $TG^0$ considered one is in the situation where the point of the theoretical grating must be made to correspond to a reference point selected from several reference points all of which a priori seem to be good candidates.

With the object of solving this problem, one starts from the center of the grating $GC^0$ and forms the first pair in this first theoretical grating constituted by the center of the grating $GC^0$ situated at an intersection of bars, and with the reference point $R_k^0$ which coincides with $GC^0$, and then second pairs $P_k^0$ are constructed around this center of the grating $GC^0$. Subsequently, on the basis of the acquired knowledge of these first and second pairs $P_k^0$, new pairs are constructed step by step by progressing pitch by pitch through the center of the grating $GC^0$ towards the edges by means of a method described hereinafter.

In accordance with this method, for constructing pairs $P_k^0$ for the first time by progressing pitch by pitch through the center $GC^0$ towards the edges of the images, a rectangular ring is defined at each pitch, which ring has an increasing size around the center $GC^0$.

Thus, at the same time, the source grating $SG^0$ and the first theoretical grating $TG^0$ with the reference point $R_k^0$ and the center of the grating $GC^0$ coinciding:

- the first ring is composed of the center of the grating $GC^0$ itself.
- the second rectangular ring is composed of its 8 direct neighbors of $GC^0$, and
- the third rectangular ring is composed of its 16 second neighbors of $GC^0$.

Figure 4E:
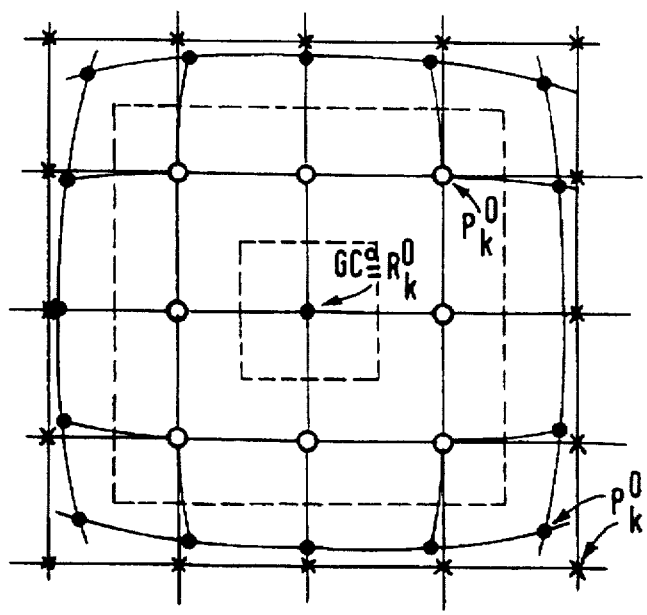
FIG. 4E illustrates the formation of rectangular rings having an increasing size for forming pairs $P_k^0$.

In FIG. 4E, the points $TR_{g(k)}^0$ of the theoretical grating are represented by means of crosses when they are sufficiently remote from the reference points $R_{f(k)}$ which are shown as circles so as to distinguish them.

The more the ring is remote from the center of the grating $GC^0$, the more pairs $P_k^0$ are formed from distinct and distant points.

Figure 6A:
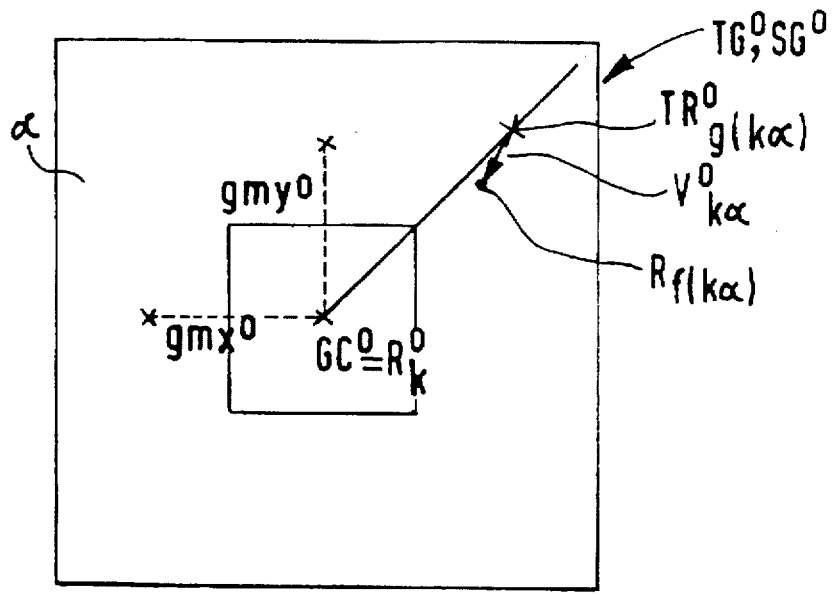
FIG. 6A illustrates the operation of causing a grating point $TR_{g(k\alpha)}^0$ to correspond to a reference point $R_{j(k\alpha)}$ in a rectangular ring $\alpha$.

With reference to FIG. 6A, in a current rectangular ring α and after a reference point $R_{f(k\alpha)}$ has been made to correspond to a point $TR_{g(k\alpha)}^0$ of the theoretical grating, a radius is drawn through the center of the grating $GC^0$ and the tested point of the grating $TR_{g(k\alpha)}^0$ in this current ring α. And the error vector is measured:

$$V_{k\alpha}^0 = TR_{g(k\alpha)}^0, R_{f(k\alpha)}$$

This vector $V_{k\alpha}^0$ constitutes the error of correspondence between the points of the pair $P_{k\alpha}^0$ in this ring α, which error is due to the distortion.

Figure 6B:
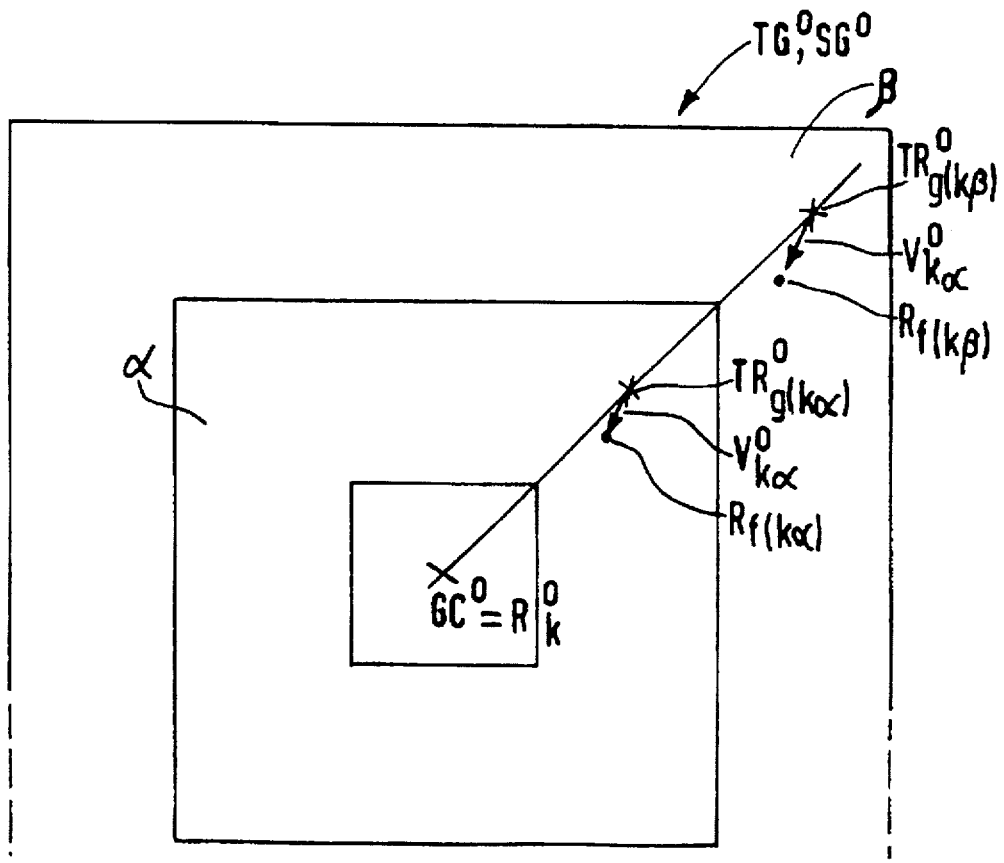
FIG. 6B illustrates the same operation in an adjacent, larger ring $\beta$.

With reference to FIG. 6B, in a subsequent ring β which is further remote from the center of the grating $GC^0$, a reference point is searched in the source image $SG^0$ to correspond to a new tested point $TR_{g(k\beta)}^0$ of the first theoretical grating $TG^0$. To this end, the error vectors $V_{k\alpha}^0$ relative to all the couples $P_{k\alpha}^0$ of the preceding ring α have been stored. The radius passing through the center $GC^0$ and the tested point $TR_{g(k\beta)}^0$ is drawn. In the previous ring α, the point of the theoretical grating $TR_{g(k\alpha)}^0$ is searched which is nearest to this radius ($GC_o$, $TR_{g(k\alpha)}$) which has been drawn. This point of the grating $TR_{g(k\alpha)}^0$ corresponds to a reference point $R_{f(k\alpha)}$ by the error vector $V_{k\alpha}^0$ defined above. This error vector $V_{k\alpha}^0$ is then applied to the new tested point $TR_{f(k\alpha)}$ for estimating the corresponding reference point. The reference point $R_{f(k\beta)}$ which is nearest to this estimation, is retained if it is found within an acceptable range of distance values defined by the components of the pitch of the theoretical grating gmx°, gmy°. A new pair $P_{k\beta}^0$ is then formed to the extent where a reference point $R_{f(k\beta)}$ exists.

A new error vector $V_{k\beta}^0$ is then stored as an input data for processing the points of the next ring.

A particular proximity criterion has thus been defined according to which, on the basis of an error vector between the points of a pair in a ring, the pairs are formed in the next ring which is further remote from the center and the new error vector is measured which has become larger in this subsequent ring. And based on the error vector measured in the preceding ring, and also step by step, the method is repeated until the size of the rings is equal to the size of the image.

II-D CONSTRUCTION OF A THEORETICAL GRATING BY MEANS OF AN ITERATION PROCESS BASED ON THE HYPOTHESIS OF RADIAL DISTORTIONS (FIG. 2A, Blocks 43 to 46)

Based on the characteristics of the first theoretical grating $TG^0$, the method according to the invention consists of constructing the best possible theoretical grating now, that is to say, constructing a theoretical grating $TG^n$ whose distortion is also corrected as much as possible.

To solve this problem, the method according to the invention is iterative. At each iteration, this method comprises the steps of:

- computing a polynomial $F^n$ for radial correction performed in the block 44,
- computing the patterning error $E^n$ and storage of the optimum value, performed in the block 45,
- modification of the optical center $OC^n$ performed in the block 46, and
- estimation of a new theoretical grating $TG^n$, performed in the block 43.

In the previous steps, a zero power index (0) is assigned to all the notations relating to the first estimations of the center GC°, the pitch GM° and the pairs $P_k^0$ of the points of the first theoretical grating TG° to be constructed. Each iteration will be marked by a power index, which index increases from zero at each new iteration. For example, at the iteration n, the center of the grating is GC$^n$, the optical center is OC$^n$, the pitch of the grating is GM$^n$, the pairs are $P_k^n$, etc.

With reference to FIG. 2A, this iterative method forms a loop.

Supposing that the construction elements of a first theoretical grating, such as TG° defined by its grating center GC°, its pitch GM°, its optical center OC°, are known,

- a polynomial F° for the correction of radial distortions is first computed in the block 44,
- a patterning error E° is subsequently computed in the block 45,
- the position of the approximate optical center, which was OC° in the first theoretical grating, is then modified in the block 46 closing the loop, this position being shifted to OC$^1$ for bringing it to an ideal position in which the radial hypothesis is verified, that is, where the points of the theoretical grating are aligned with the reference points and with the optical center, as shown in FIG. 3D,
- having modified the optical center, which is now denoted OC$^1$, the construction elements of a second theoretical grating TG$^1$ defined by its grating center GC$^1$, its grating pitch GM$^1$ are re-estimated in the block 43; this second theoretical grating TG$^1$ is constructed by means of these new elements GC$^1$ and GM$^1$, and in this block 43, the new points of the theoretical grating $TR_{g(k)}^1$ are made to correspond to the reference points of the source image SG°, and
- at this instant, the iteration method is continued, in the block 44, by computing the correction polynomial F$^1$ for the radial distortions, subsequently, in the block 45, by computing the patterning error E$^1$ and further, in the block 46, by modification of the optical center which will become OC$^2$, etc.

The iteration n will now be performed at the output of the block 46 of the loop after the position of the optical center has been modified, thus becoming OC$^n$.

This knowledge of the new optical center OC$^n$ is used in the block 43 of the iteration process where, at that time, one has only the disposal of the characteristics of the theoretical grating TG$^{n-1}$ at the iteration n−1, and where new characteristics of the theoretical grating will be further computed, including a new grating center GC$^n$ and a new grating pitch GM$^n$ for constructing the new theoretical grating at the iteration n.

In the same block 43, the new points $TR_{g(k)}^n$ of the theoretical grating and reference points $R_{f(k)}$ are subsequently made to correspond for forming the new pairs $P_k^n$.

II.D1. Precise Estimation of the Grating Center GC$^n$ and the Grating Step GM$^n$ (FIG. 2A, Block 43)

With reference to FIG. 2A, in the block 43, at iteration n, one starts from the fact that the optical center OC$^n$ is known which is updated in the block 46 of the iteration loop.

One also starts from the pairs of points $P_k^{n-1}$ which are denoted as:

$$P_k^{n-1} = R_{f(k)}, TG^{n-1}_{g(k)}$$

where the power indexes indicate the iteration number n−1 at which these values have been determined.

One starts also from the fact that:

the center of the grating $GC^{n-1} = (gcx^{n-1}, gcy^{n-1})$, and
the pitch of the theoretical grating $GM^{n-1} = (gmx^{n-1}, gmy^{n-1})$ are known at the last iteration n−1.

At the iteration n:

an improved grating center $GC^n = (gcx^n, gcy^n)$, and
and an improved grating step $GM^n = (gmx^n, gmy^n)$ are now determined. These parameters define a new update of the grating points $TR_{g(k)}^n$. All the updated grating characteristics are computed in pixels in the reference frame of fixed coordinates $\Omega x, \Omega y$.

To this end, the basic hypothesis is used, which is referred to as radial hypothesis, according to which, if the optical center OC$^n$ is correct, the distortions, which are radial by nature, result in a shift of the points of the grating of the real test pattern M along radii passing through the center OC$^n$ and through the reference points $R_{f(k)}$ as shown in FIG. 3D.

This indicates that the points $TR_{g(k)}^n$ of the theoretical grating would be present near these radii. This means that the best theoretical grating should be computed in such a way that the geometrical distance is minimized between the points of the theoretical grating $TR_{g(k)}^{n-1}$ at the iteration n−1, and a radius passing through the optical center OC° estimated in this iteration loop n and said reference points $R_{f(k)}$.

Figure 7A:
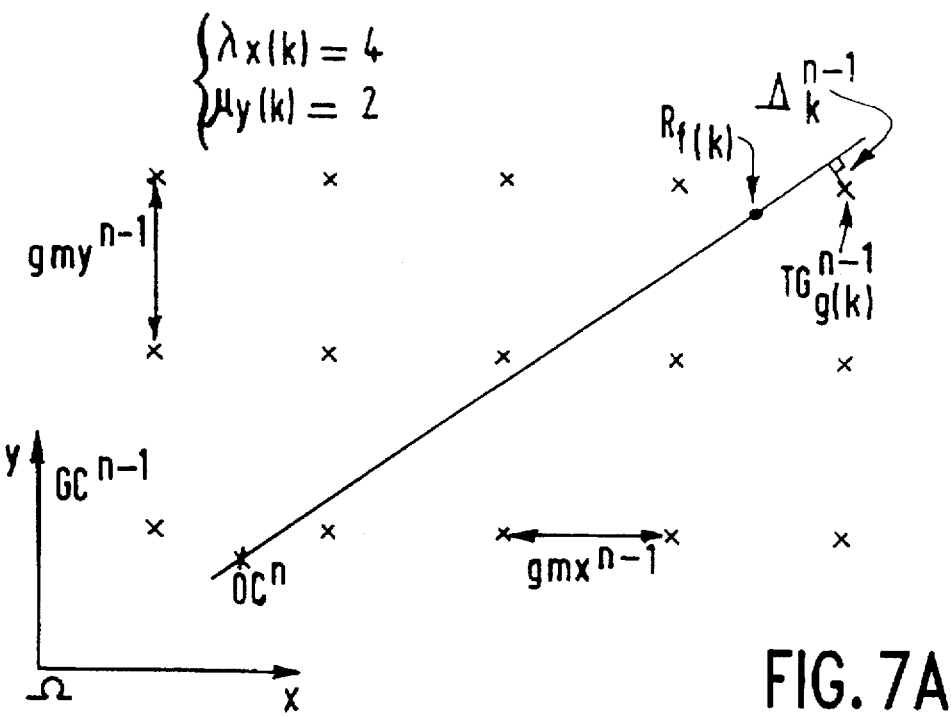
FIG. 7A illustrates the determination of the errors $\Delta_k^n$ of aligning the pairs $P_k^n$ with the optical center $OC^n$, which errors are due to the distortion.

FIG. 7A shows, from the block 46, the optical center OC$^n$, the grating point $TR_{g(k)}^{n-1}$ stored at the preceding iteration n−1, the corresponding reference point $R_{f(k)}$ forming a couple $P_k^{n-1}$ with said grating point $TR_{g(k)}^{n-1}$ at the preceding iteration n−1. The radius OC$^n$–$R_{f(k)}$ is drawn, and the geometrical distance $\Delta_k^{n-1}$ between the grating point $TR_{g(k)}^{n-1}$ and the radius OC$^n$–$R_{f(k)}$ is shown.

In this step of the method, at the iteration n, this geometrical distance $\Delta_k^{n-1}$ is minimized for improving the alignment of the optical center OC$^n$ and points of the pairs formed from grating points and corresponding reference points.

More precisely, a distance:

$$\Delta_k^n = [TR_{g(k)}^{n-1}, (OC^n, R_{f(k)})]$$

is defined which is the geometrical distance, stored at the iteration n−1, between a point $TR_{g(k)}^{n-1}$ of the theoretical grating TG$^{n-1}$ and the radius passing through the center OC$^n$ and the corresponding reference point $R_{f(k)}$.

In the fixed reference frame $\Omega x, \Omega y$, this can be written as:

$$TR_{g(k)}^{n-1} = [(gcx^{n-1} + gmx^{n-1} \times \lambda_{x(k)}), (gcy^{n-1} + gmy^{n-1} \times \mu_{y(k)})]$$

In this formula, the grating points $TR_{g(k)}^{n-1}$ only depend on components $gmx^{n-1}, gmy^{n-1}$ of the pitch of the theoretical grating and on components $gcx^{n-1}, gcy^{n-1}$ of the center of the theoretical grating.

In this formula, the parameters $\lambda_{x(k)}$ and $\mu_{y(k)}$ define the number of the pitch of the theoretical grating $gmx^{n-1}$ and $gmy^{n-1}$, respectively, which must be shifted parallel to the axes $\Omega x, \Omega y$ for finding the grating point $TR_{g(k)}^{n-1}$ starting from the center of the theoretical grating having the coordinates $gcx^{n-1}, gcy^{n-1}$.

For example, for realizing FIG. 7A, it has been supposed that the grating point is at $\lambda_{x(k)} = 4$ grating pitches in the horizontal direction, and at $\mu_{y(k)} = 2$ grating pitches in the vertical direction, starting from the grating GC$^{n-1}$ which itself is marked by its components $gcx^{n-1}, gcy^{n-1}$ in the form of pixels within the fixed reference frame $\Omega x, \Omega y$.

The center GC$^n$ and the grating pitch GM$^n$ are subsequently computed at this iteration n, in the block 43, by minimizing a criterion denoted as $\Phi^n$ which will hereinafter be referred to as radial criterion expressing the radial hypothesis elucidated above according to which the best possible theoretical grating corresponds to distances $\Delta_k^n$ which are smaller at the iteration n than at the iteration n−1.

This radial criterion can be written as:

$$\Phi^n(gcx^n, gcy^n, gmx^n, gmy^n) = \Sigma(\Delta_k^n)^2$$

In order that this criterion $\Phi^n$ is an unambiguous solution, the solution should be excluded in which the pitch of the grating is zero and in which the center of the grating coincides with the optical center because, in all these cases, the criterion $\Phi^n$ is zero and no constructive solution can be found. On the other hand, if the pitch of the grating is limited to a reasonable value and if the center of the grating is different from the optical center, the problem is better presented.

Any method of minimization leading to a non-singular solution is satisfactory and may be used. According to the invention, a method is proposed which includes the following steps:

start with a reasonable value of the pitch of the grating $GM^{n-1}$ by putting the components $gmx^{n-1}$ and $gmy^{n-1}$ of the fixed grating pitches in the radial criterion $\Phi^n$, minimization of the radial criterion $\Phi^n$ with respect to the center of the grating $GC^{n-1}$ as the components $gmx^{n-1}$, $gmy^{n-1}$ of the pitches are fixed, the formula of the radial criterion $\Phi^n$ is derived with respect to two variable coordinates $gcx^{n-1}$, $gcy^{n-1}$ of the center of the grating $GC^{n-1}$. This computation of derivatives provides two explicit formulas which give values of the coordinates $gcx^n$ and $gcy^n$ for updating the center of the grating $GC^n$ at this iteration n, minimization of the radial criterion $\Phi^n$ with respect to the pitch of the grating $GM^{n-1}$: now the coordinates $gcx^n$ and $gcy^n$ of the grating center which have been computed are fixed and the formula of the radial criterion $\Phi^n$ is derived with respect to the variable components of the grating pitch $gmx^{n-1}$, $gmy^{n-1}$. This computation of derivatives again provides two explicit formulas which give values of the components $mgx^n$ and $gmy^n$ for updating the pitch of the grating $GM^n$ at this iteration n, and repetition of these operations as many times as is necessary until a required precision has been achieved.

II-D2. Estimation at the Iteration N of Pairs of Reference Points and Corresponding Theoretical Grating Points (FIG. 2A, Block 43)

This operation is performed by carrying out exactly the same procedure as for the first theoretical grating, except that the values of the center and the pitch $GC^n$ and $GM^n$, updated at the iteration n during the previous step, are used.

At the iteration n, in the block 43 of FIG. 2A, there is now in the fixed reference frame $\Omega x$, $\Omega y$:

an update of the coordinates of the center of the grating $GC^n = (gcx^n, gcy^n)$, an update of the components of the pitch of the grating $GM^n = (gmx^n, gmy^n)$, and the position of the optical center $OC^n$ from block 46.

These characteristics allow the construction of a new updated theoretical grating $TG^n$ having rectangular meshes which are regularly spaced as in FIG. 3E.

The method of causing the reference points $R_{f(k)}$ of the source grating $SG^0$ to correspond to the points $TG_{g(k)}^n$ of the new theoretical grating $TG^n$ for forming new pairs $P_k^n$ is then realized. Due to the change of the center and the pitch of the new theoretical grating, the reference point found at iteration n−1 for forming a pair with a given point of the grating may now no longer be the best candidate. A new operation of providing correspondence should thus be carried out.

This new operation of providing correspondence between the grating points of the theoretical grating $TG^n$ and the reference points of the source, is realized by considering rectangular rings increasing around the center of the grating $GC^n$ localized by its new coordinates $(gcx^n, gcy^n)$ and by forming the pairs $P_k^n$ in a step-by-step progression and ring after ring by applying the proximity criterion proposed for the construction of the first theoretical grating $TG^0$.

II-E COMPUTATION OF A RADIAL CORRECTION POLYNOMIAL (FIG. 2A, Block 44)

Starting from the pairs $P_k^n$ determined during the previous step of the chain constituting the iteration n, pairs of radii are now computed:

a first radius $K_k^n$ having as a value the length of the segment which connects the optical center $OC^n$ and the grating point $TG_{g(k)}^n$ of one of these pairs $P_k^n$; and a second radius $Y_k^n$ having as a value the length of the segment which connects the optical center $OC^n$ and the reference point $R_{f(k)}$ of this couple $P_k^n$.

Figure 7B:
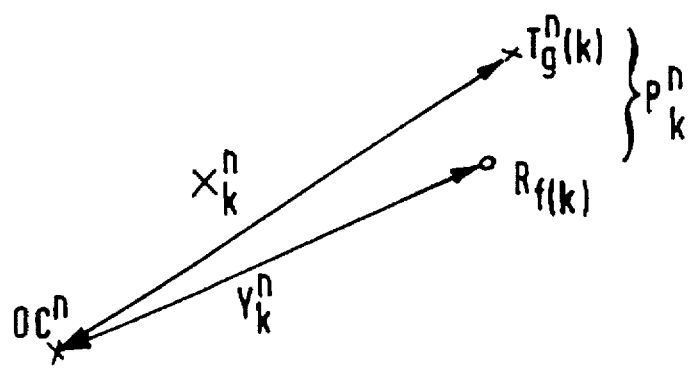
FIG. 7B illustrates the determination of the pairs of radii $X_k^n$ and $Y_k^n$ for estimating the polynomial function $F^n$.

With reference to FIG. 7B, these radii are expressed by:

$$X_k^n = (OC^n, TR_{g(k)}^n)$$

$$Y_k^n = (OC^n, R_{f(k)})$$

in which $(TR_{g(k)}^n, R_{(k)}) = P_k^n$.

These pairs of radii are computed for each pair $P_k^n$ of the newly updated theoretical grating $TG^n$.

A polynomial function $F^n$ is subsequently computed, which, at best, connects the radii $Y_k^n$ with the radii $X_k^n$ of each pair $P_k^n$.

Figure 8A:
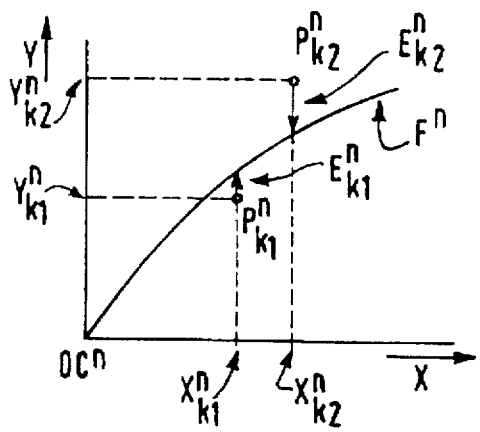
FIG. 8A illustrates the determination of a polynomial $F^n$ for connecting at best the points formed by the pairs of radii $X_k^n$ and $Y_n^k$ plotted on the abscissa and the ordinate, respectively, in a graph in a graduation of original pixels $OC^n$.

With reference to FIG. 8A, radii $X_{k1}^n$, $X_{k2}^n$ on the abscissa X and radii $Y_{k1}^n$, $Y_{k2}^n$ on the ordinate Y are shown in the graph, forming pairs $P_{k1}^n, P_{k2}^n$, respectively, the optical center $OC^n$ being placed at the origin of the axes of these coordinates in a pixel graduation. In this graph, these couples $P_{k1}^n, P_{k2}^n$ form points symbolized by small circles which are distributed on both sides of the curve representing the searched polynomial function $F^n$. In FIG. 8A, only two pairs of radii are shown for the purpose of clarity of the Figure.

Figure 8D:
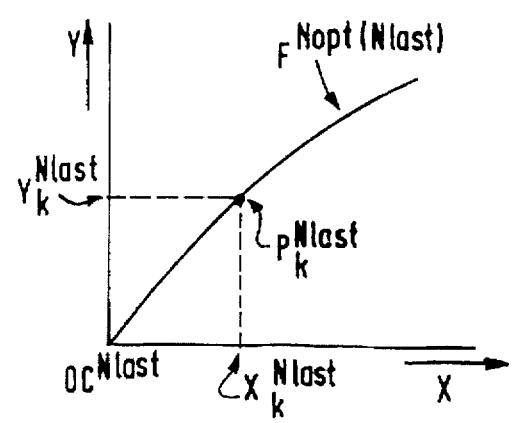
FIG. 8D shows the points of the pairs $P_k^{Nlast}$ ideally placed on a curve which is representative of the best polynomial $F^{Nlast(Nopt)}$ for minimizing the patterning error.
Figure 8B:
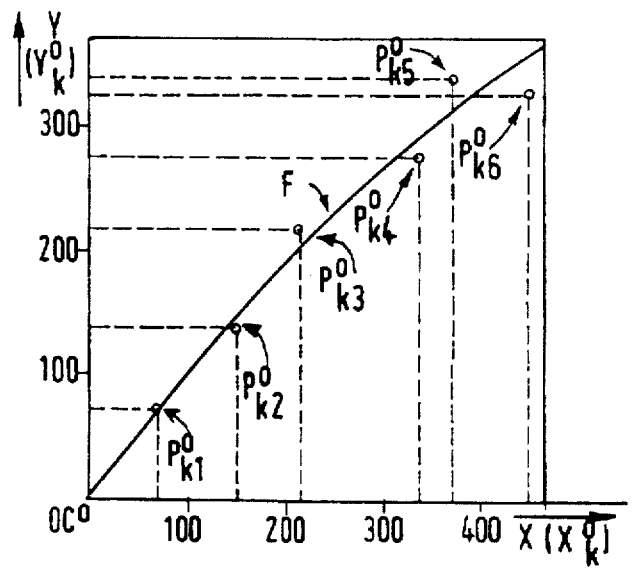
FIG. 8B illustrates the determination of the first polynomial $F^0$ at the zero iteration in the iterative method and FIG. 8C illustrates the determination of an improved polynomial $F^n$ at a subsequent n iteration.

With reference to FIG. 8B, a graph shows the axes of coordinates X and Y graduated in a number of pixels, with six pairs $0P_{k1}^0, P_{k2}^0, P_{k3}^0, P_{k4}^0, P_{k5}^0, P_{k6}^0$ formed in relation with the first theoretical grating $SG^0$. In this graph, the optical center $OC^0$ is at the origin of the axes of coordinates, and the radii $X_k^0$, $Y_k^0$ are on the axes of the abscissas and ordinates, respectively. At this zero iteration, the points representing the pairs $P_k^0$ form a cloud of points around the curve which is representative of the function $F^0$ found for connecting the radii $X_k^n$, $Y_k^n$.

Figure 8C:
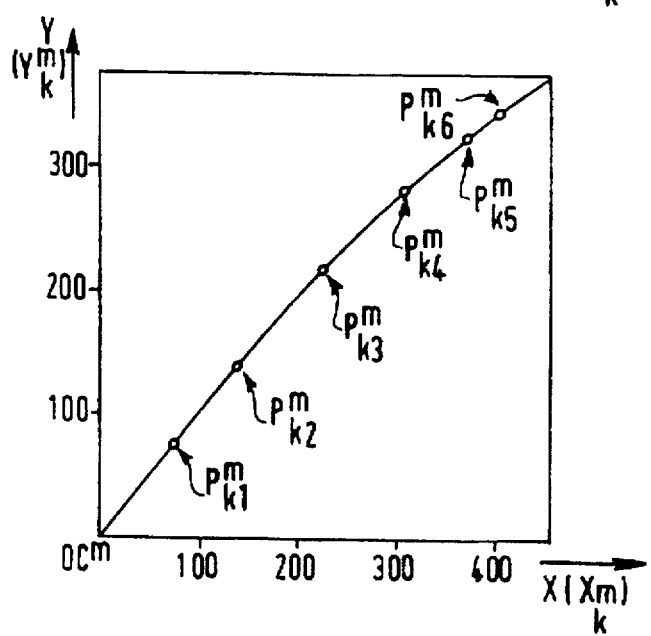

With reference to FIG. 8C, a graph shows the axes of coordinates X and Y graduated in a number of pixels, with six other pairs $P_{k1}^m, P_{k2}^m, P_{k3}^m, P_{k4}^m, P_5^m, P_{k6}^m$ formed in relation with a theoretical grating $SG^m$ at an iteration enumerated m where the correction of distortions has become practically perfect. In this case, the assembly of pairs $P_k^m$ constitutes a smooth curve corresponding to the polynomial function $F^m$.

With reference to FIGS. 8A to 8C, it is found that the function $F^n$, which is best suited for connecting the pairs of radii $X_k^n$, $Y_k^n$ at the iteration n, is a polynomial of the degree 5 or 6; for example, a polynomial of the degree 3 is not sufficient for solving this problem. It has appeared that the correction of the radial distortions requires the computation of a polynomial of an order which is higher than 3.

With reference to FIG. 8A, at the iteration n, the error $E_{k1}{}^n$, $E_{k2}{}^n$, ..., which exists between the radii $Y_{k1}{}^n$, $Y_{y2}{}^n$ ..., and the polynomial function $F^n$ which, at best, connects the points of the pairs $P_{k1}{}^n$, $P_{k2}{}^n$ .... can be measured for each radius $X_{k1}{}^n$, $X_{k2}{}^n$ .... respectively. In the assembly of the pairs $P_k{}^n$ of the theoretical grating $TG^n$, at the iteration n, this error, which will hereinafter be referred to as patterning error $E^n$, is written as:

$$E^n = \Sigma_k\{[Y_k{}^n - F^n(X_k{}^n)]^2\}$$

It is important to note that the polynomial $F^n$, hereinafter referred to as the radial correction polynomial, constitutes a transformation formula at the iteration n, allowing passage from:

a point $TR_{g(k)}{}^n$ of the corrected theoretical grating, and to a reference point $R_{f(k)}$ of the distorted source grating.

This polynomial $F^n$ may be decomposed into two rectangular components $F_x{}^n$ and $F_y{}^n$.

II-F. COMPUTATION OF THE PATTERNING ERROR (FIG. 2A, Block 45)

With reference to FIG. 2A, in the chain constituting the iteration n, and at the step symbolized by the block 45, the best radial correction polynomial $F^n$ is computed for minimizing the patterning error $E^n$ by means of a conventional linear regression operation.

A patterning error $E^n$ is computed at each iteration from 0 to, for example, 10. These patterning errors $E^0$, $E^1$ ... $E^{10}$ are stored. Among the different patterning errors computed in the course of the 10 cycles of iteration taken as an example, one of them, at an iteration enumerated Nopt, is found to be smaller than the other errors computed at the previous iterations and possibly at the subsequent iterations.

This minimal error $E^{Nopt}$ is stored at the same time as the radial correction polynomial $F^{Nopt}$, or its rectangular components $F_x{}^{Nopt}$, $F_y{}^{Nopt}$.

II-G. MODIFICATION OF THE OPTICAL CENTER OF THE THEORETICAL GRATING (FIG. 2A, Block 46)

The patterning error $E^n$, previously computed at the iteration n in the method according to the invention, based on the radial hypothesis, strongly depends on the position $OC^n$ found for the optical center, which will be ideal when it is in the center of the distortions.

In the iteration chain shown in FIG. 2A, a loop is found which is concretely shown as the block 46 whose input receives the data of the block 45 for computing the error energy and whose output supplies to the block 43 a modified optical center $OC^{n+1}$ for computing a new theoretical grating $TG^{n+1}$ in a new iteration n+1.

It will be recalled that, according to the invention, the minimization of the energy of the error $E^n$ forms the solution to the problem of correcting the distortions based on the radial hypothesis.

To this end, at each iteration from, for example, 0 to 10, the position of the optical center $OC^n$, marked in the theoretical grating $TG^n$ by its coordinates within the fixed reference frame $\Omega x$, $\Omega y$ $$OC^n = (ocx^n, ocy^n)$$

is modified for cooperating in the minimization of the patterning error $E^n$. The best position of the optical center $OC^n$ for obtaining this minimization may be searched in several manners.

In a first method, a large search zone is defined around the initial optical center denoted $OC^0$ at the iteration zero. In the course of each iteration, one of the points of this full search zone is tested for constituting an optical center. As many iterations are realized as there are points to be tested in the full search zone. Finally, the optical center corresponding to the smallest patterning error is retained as the optical center.

A second method, which is less costly as far as the computation time is concerned, is based on the computation of gradients. In two successive iterations, a first localization and then a second localization are tested in a given direction, starting from the first optical center $OC^0$. According as these first tests contribute to a decrease or an increase of the patterning error $E^n$, the best position of the optical center continues to be searched in the same direction and the same sense, or in the same direction and in an opposite sense. Then other directions are tested at a given angle to the first direction, and finally the iteration is retained in which, in one direction and one given sense, the best optical center for minimizing the patterning error is found.

The number Nlast of the iteration, at which the position of this best optical center is formed for minimizing the patterning error, is stored.

II-H. OUTPUT OF THE ITERATION CHAIN

Under these conditions, the best update conditions at the output of the block 45, shown in FIG. 2A, correspond to an iteration in which the conditions found at Nopt and the conditions found at Nlast are made to cooperate. This iteration will be the last iteration: it is numbered Nopt (Nlast).

The best corresponding polynomial function for minimizing the patterning error is then written as:

$$G = F^{Nopt(Nlast)}$$

and its rectangular components are two polynomials written as:

$$G_X = F_X(x, xy) \text{ Nopt(Nlast)}$$
$$G_Y = F_Y(y, xy) \text{ Nopt(Nlast)}$$

These components are polynomials having two coordinates because each must be applied to a point of the pair $P_k{}^n$ in Cartesian coordinates.

Figure 7C:
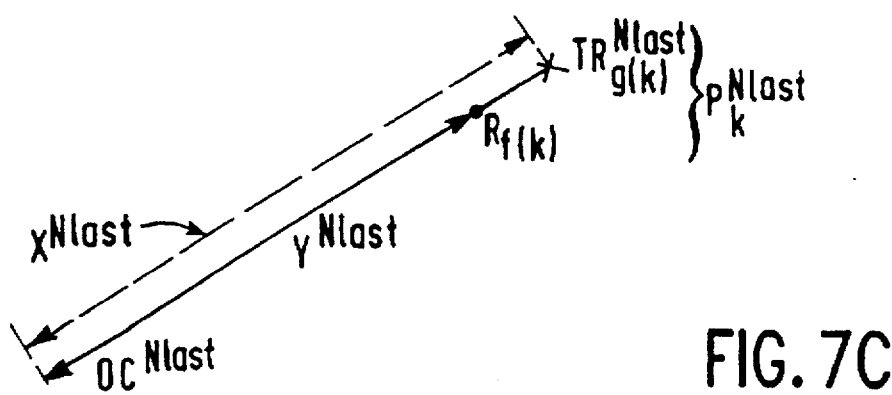
FIG. 7C represents the points of the pairs $P_k^{Nlast}$ ideally aligned with the center $OC^{Nlast}$ which at best minimizes the patterning error.

With reference to FIG. 7C and FIG. 3D, it appears that after the iteration operations, which have led to the determination of conditions corresponding to the last iteration Nopt(Nlast), the optical center now has a position:

$$OC^{Nlast}$$

and the grating points $TR_{g(k)}{}^{Nlast}$ and the reference points $R_{f(k)}$ forming the pairs $P_k{}^{Nlast}$ are, at best, aligned on the same radius.

With reference to FIG. 8D, the points of the pairs $P_k{}^{Nlast}$ are located on the smooth curve representing the polynomial function $F^{Nlast(Nopt)}$.

An ideal theoretical grating corresponding to these conditions is shown in FIGS. 3F and 3G, $TG^{n1}$ and $TG^{n2}$.

Once the polynomial function G, or the components $G_X$ and $G_Y$ have been computed, ALL THE PRECEDING STEPS ARE DEFINITIVELY TERMINATED.

The knowledge of the functions G, or $G_X$, $G_Y$ is sufficient to ensure the correction of the optical distortions of each image picked up by the camera 2 and its camera system 1 (FIG. 1).

III. CORRECTION OF THE OPTICAL DISTORTIONS IN AN IMAGE (FIG. 1, Sub-assembly 47; and FIG. 2A, Sub-assembly 47, and FIG. 2B)

As stated hereinbefore, the components $G_X$ and $G_Y$ are transformation formulae which pass from the rectified space denoted target image TI to the distorted space denoted original source image SI.

In the target image TI to be constructed, the coordinates of each pixel $X_{TI}$ and $Y_{TI}$ in the fixed reference frame $\Omega x$, $\Omega y$ are stored. The image TI is then scanned pixel by pixel, for example, by way of conventional video scanning.

The value of the intensity at the monochromatic light level, or grey level, which must be attributed to the current pixel $X_{TI}$, $Y_{TI}$ of the target image, is searched at an address of the source image $X_{SI}$, $Y_{SI}$ computed by means of the transformation polynomials $G_X$, $G_Y$ stored in the block 47:

$$X_{SI}=G_X(X_{TI},Y_{TI})$$

$$Y_{SI}=G_Y(X_{TI},Y_{TI})$$

As the point found at the address $X_{SI}$, $Y_{SI}$ in the source image SI is generally not a pixel, the monochromatic light level, or grey level, is computed for this point by means of interpolation based on the intensity of its neighboring pixels in this source image. Then the intensity value computed by interpolation is attributed to the current pixel at the address $X_{TI}$, $Y_{TI}$ in the target image and is stored in the second picture memory.

We claim:

1. A device for forming an image, comprising:

a camera system;

a system for acquisition of data of a source image distorted by the camera system;

a system for digitizing said source image including a first image memory for storing intensity data of each pixel marked by an address in a bidimensional matrix; and a system for processing the digital image for constructing a distortion-corrected target image corresponding to the source image, in which the image processing system includes:

a first sub-assembly for predetermining, on the basis of image data of a distorted TEST source image, an optical center and a polynomial function for correcting radial distortions around said optical center; and a second sub-assembly including a memory for storing the optical center and the polynomial function determined by the first sub-assembly, a computing block for applying the polynomial function to each pixel address of the target image, and for supplying an address of a pixel in the distorted source image in which an intensity data is present which is to be applied to the initial address in the target image, and a second image memory for storing data of the target image.

2. A device for forming images as claimed in claim 1, in which:

the first sub-assembly includes blocks for treating the source image TEST, said source image TEST being formed as a grating, referred to as source grating, for constructing a target image TEST, referred to as theoretical grating, said blocks comprising:

a block for extracting reference points at the points of intersection of the bars of the source grating;

a block for estimating the first approximate theoretical grating, computing the address of a center and the step size of said first theoretical grating;

a block for estimating a distortion-corrected theoretical grating, computing by way of iteration the address of a center and the step size of said corrected theoretical grating;

a block for computing a correction polynomial of the radial distortions, providing a transformation rule for passing a point of the corrected theoretical grating at the iteration n to a reference point of the distorted source grating, which transformation rule operates at the iteration n;

a block for computing a patterning error due to the iteration n transformation rule; and a block for computing a modified address of the optical center which minimizes the patterning error.

3. A method of correcting geometrical optical distortions produced in an image by a camera system, said method comprising the preliminary steps of:

a) acquiring data and digitizing a TEST source image, including storing intensity data of each pixel marked by an address in a bidimensional matrix;

b) estimating an optical center located, at best, at the optical distortion center of the TEST source image and the ratio of said optical center computed in a digital image to be constructed, referenced TEST target image representing the corrected TEST source image of the optical distortions; and c) estimating a polynomial function for causing the address of a corresponding point, denoted reference point, in the distorted TEST source image to correspond to the address of a pixel in the corrected TEST target image, based on the hypothesis that the geometrical optical distortions in the TEST source image are radial around the distortion center, so that said corresponding points are aligned, at best, with the estimated optical center.

4. A method as claimed in claim 3, comprising, in the preliminary steps, the iterative steps of:

d) estimating the best polynomial function capable of minimizing, at an iteration of the order of Nopt, the patterning error realized at the localization of the pixels of the TEST target image constructed at a preceding iteration in accordance with the hypothesis of radial distortions around an optical center estimated at said preceding iteration; and e) estimating, at an iteration of the order of Nlast, an optimized modified optical center and re-estimating under these conditions a new polynomial function capable of further minimizing the patterning error realized at the localization of the pixels of the reconstructed target image in accordance with the hypothesis of radial distortions around said estimated optimized modified optical center.

5. A method as claimed in claim 4, in which the preliminary steps are performed once, said method comprising, at the start of the preliminary steps, the steps of:

$a_o$) acquiring the data of a source image distorted by the camera system, digitizing and storing the intensity data of each pixel; and f) correcting the optical distortions by applying the best estimated polynomial function to a digital target image to be constructed, so as to supply, on the basis of each address in said target image, a corresponding address in the distorted digital source image in which an intensity function is found which is applied to said address in the target image to be constructed.

6. A method as claimed in claim 3, in which the preliminary steps are performed once, said method comprising, at the start of the preliminary steps, the steps of:

$a_0$) acquiring the data of a source image distorted by the camera system, and digitizing and storing intensity data of each pixel; and f) correcting the optical distortions by applying the estimated polynomial function to a digital target image to be constructed, so as to supply, on the basis of each address of this target image, a corresponding address in the distorted digital source image in which an intensity data is found which is applied to said address in the target image to be constructed.

7. A method as claimed in claim 3, in which:

in the preliminary step a) of acquiring the data and digitizing, the TEST source image is the digitized image of a rectangular mesh whose bars are parallel to the rows and columns of pixels, to the most approximate optical distortions referred to as source grating;

in the step b), said optical center is estimated in an iterative manner on the basis of a zero iteration comprising the construction of a first distortion-corrected TEST target image, referred to as first target grating, by means of the sub-steps of:

extracting one point per zone of intersection of the bars of the source grating, these extracted points being denoted as reference points of the source grating;

estimating a reference point which is nearest to the center of distortions of the source grating;

transferring this reference point into the first target grating for constituting a first center of the grating;

estimating a first grating pitch for said target grating; and estimating a first approximate optical center for said first target grating coinciding with said transferred reference point and coinciding with the center of the grating.

8. A method as claimed in claim 7, in which in step d), the iterative estimation of the best polynomial function comprises the estimation, in a zero-order iteration, of a first polynomial function comprising the sub-steps of:

constructing points of the first target grating on the basis of the center of the grating and the grating step to correspond to the reference points of intersection of the bars of the source grating;

causing the grating points of the first target grating and the reference points of the source grating to correspond by localizing the center of the grating coinciding with the reference point which is nearest to the center of distortion;

forming the pairs constituted by the grating points and the corresponding reference points step by step from the center to the edges of the target grating;

estimating the pairs of radii formed by segments joining the optical center of the first target grating and each point of the pairs of target grating points and the reference point; and computing the first polynomial function as the one which best connects the pairs of radii in conformity with the hypothesis in accordance with which the distortions are radial around the optical center.

9. A method as claimed in claim 8, in which in step d), the iterative estimation of the best polynomial function comprises the estimation, in an n>0 order iteration, of a polynomial function comprising the sub-steps of:

constructing a target grating at the order of n, having an optical center and grating points defined by a center of the grating and a grating pitch;

causing the grating points of the target grating to correspond to the reference points of the source grating by localizing the center of the target grating by means of its coordinates determined in the preceding iteration;

forming pairs of grating points and reference points step by step from the center towards the edges of the target image;

estimating the pairs of radii formed by segments joining the known optical center and each point of the pairs; and computing the polynomial function as the one which best connects the pairs of radii in conformity with the hypothesis in accordance with which the geometrical distortions are radial around the optical center.

10. A method as claimed in claim 9, in which the construction of a target grating at the current iteration (n) comprises the sub-steps of:

localizing an optical center which is re-updated;

localizing the grating points and corresponding reference points constituting pairs formed at the preceding iteration;

estimating the geometrical distances on the abscissa of the grating points of the radii passing through the re-updated optical center and through the corresponding reference points of the pairs formed at this preceding iteration;

estimating a criterion, referred to as radial criterion, which expresses the radial hypothesis that the best corrected target grating corresponds to the minimization of the geometrical distances; and minimizing the radial criterion expressed as a function of the coordinates of the center and of the components of the grating pitch at the iteration, supplying the center coordinates and the components of the target grating pitch at the iteration.

11. A method as claimed in claim 10, in which the step b) of estimating the optical center is realized in an iteration loop in which, at each current iteration, the localization of the optical center is modified and then reintroduced in the construction of the current target grating for determining a new polynomial function, and estimating the corresponding patterning error the best localization of the center being that which results in the smallest patterning error corresponding to the best polynomial function.

* * * * *